(12) United States Patent
Muñoz de la Torre Alonso et al.

(10) Patent No.: US 12,556,616 B2
(45) Date of Patent: Feb. 17, 2026

(54) EXPOSURE AND DISCOVERY OF DISTRIBUTED NETWORK FUNCTIONS SERVING A USER EQUIPMENT OR PPDU SESSION

(71) Applicant: Telefonaktiebolaget LM Ericsson (publ), Stockholm (SE)

(72) Inventors: Miguel Angel Muñoz de la Torre Alonso, Madrid (ES); Ulf Mattsson, Kungsbacka (SE); Antonio Iniesta Gonzalez, Madrid (ES); Miguel Angel Garcia Martin, Madrid (ES); Maria Belen Pancorbo Marcos, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 667 days.

(21) Appl. No.: 17/911,926

(22) PCT Filed: Mar. 5, 2021

(86) PCT No.: PCT/IB2021/051877
§ 371 (c)(1),
(2) Date: Sep. 15, 2022

(87) PCT Pub. No.: WO2021/191712
PCT Pub. Date: Sep. 30, 2021

(65) Prior Publication Data
US 2023/0156577 A1 May 18, 2023

(30) Foreign Application Priority Data
Mar. 23, 2020 (EP) .................................... 20382220

(51) Int. Cl.
*H04L 67/51* (2022.01)
*H04L 41/122* (2022.01)
*H04W 48/16* (2009.01)

(52) U.S. Cl.
CPC ............. *H04L 67/51* (2022.05); *H04W 48/16* (2013.01); *H04L 41/122* (2022.05)

(58) Field of Classification Search
CPC ......... H04L 63/00; H04L 67/51; H04L 67/41; H04L 41/0895; H04L 45/50;
(Continued)

(56) References Cited

U.S. PATENT DOCUMENTS 11,224,009 B2 * 1/2022 Krishan ................ H04W 28/24

FOREIGN PATENT DOCUMENTS

WO 2019197467 A1 10/2019

OTHER PUBLICATIONS

3rd Generation Partnership Project, "3rd Generation Partnership Project; Technical Specification Group Services and System Aspects; Architecture enhancements for 5G System (5GS) to support network data analytics services (Release 16)", 3GPP TS 23.288 V16.3.0 (Mar. 2020).

(Continued)

*Primary Examiner* — Diane D Mizrahi
(74) *Attorney, Agent, or Firm* — COATS & BENNETT, PLLC

(57) ABSTRACT

Methods and apparatus are provided to enable a consumer network function (consumer NF) to discover instances of a NWDAF 90 co-located with NFs in the 5GC 30 of a communication network 10. Existing procedures and messages between NFs are leveraged to distribute lists of NWDAFs 90 co-located with a NF, such as a UPF 35, AMF 40 or SMF 45. A NF can provide a list of NWDAF instances for a particular UE 15 that are co-located with either the same NF or a separate producer NF when the communication procedure for the UE 15 is invoked. Over time, the consumer NFs build a database associating the co-located NWDAFs in other NFs with corresponding UEs 15 served by the consumer NF. When the consumer NF needs analytic data for one or more UEs 15 served by the consumer NF, the consumer NF can use a UE ID to look up the co-located NWDAFs for the UE 15 and subscribe with the co-located NWDAF instances to receive analytics data for the UE 15.

10 Claims, 16 Drawing Sheets

(58) Field of Classification Search
CPC ..... H04L 45/586; H04L 45/76; H04L 47/125; H04L 63/0272; H04L 41/40; H04W 48/00; H04W 16/24; H04W 4/90; H04W 28/0861; H04W 40/02; H04W 48/18; H04W 88/16

See application file for complete search history.

(56) References Cited

OTHER PUBLICATIONS

3GPP, 3rd Generation Partnership Project; Technical Specification Group Services and System Aspects; System architecture for the 5G System (5GS); Stage 2; (Release 16); 3GPP TS 23.501 V16.3.0 (Dec. 2019).

3GPP, 3rd Generation Partnership Project; Technical Specification Group Core Network and Terminals; Interface between the Control Plane and the User Plane Nodes; Stage 3 (Release 16); 3GPP TS 29.244 V16.2.0 (Dec. 2019).

Huawei, et al., Solution to multiple NWDAF instances, SA WG2 Meeting #136AH, Jan. 13-17, 2020, Incheon, Korea, S2-2000854.

3GPP, 3rd Generation Partnership Project; Technical Specification Group Services and System Aspects; Architecture enhancements for 5G System (5GS) to support network data analytics services (Release 16), 3GPP TS 23.288 V16.2.0 (Dec. 2019).

Huawei, et al., Solution to multiple NWDAF instances, SA WG2 Meeting #136AH, Jan. 13-17, 2020, Incheon, Korea, S2-2001210 (merge of S2-2000854, 2000167).

Ericsson, Removing Editor's note on how to register analytic metadata in NRF, SA WG2 Meeting #S2-129, Oct. 15-19, 2018, Dongguan, P.R. China, S2-1810226 (revision of S2-18xxxx).

* cited by examiner

EXPOSURE AND DISCOVERY OF DISTRIBUTED NETWORK FUNCTIONS SERVING A USER EQUIPMENT OR PPDU SESSION

RELATED APPLICATIONS

This application claims priority to European Application No. 20382220.0, filed 23 Mar. 2020, disclosure of which is incorporated in its entirety by reference herein.

TECHNICAL FIELD

The present disclosure relates generally to a service-based architecture for exposing and discovery of networks functions serving a particular user equipment (UE) or group of UEs and, more particularly to methods and apparatus for exposing and discovering instances of a Network Data Analytics Function (NWDAF) co-located with a Network Function (NF) that is serving a particular UE or group of UEs.

BACKGROUND

Release 15 (Rel-15) of the Third Generation Partnership Project (3GPP) standard for Fifth Generation (5G) networks introduces a new network function called the Network Data Analytics Function (NWDAF) and its basic functionality is specified in Release 16 (Rel-16), which is currently under development. Development of more advanced uses cases is planned for Rel-17.

According to Rel-16, the NWDAF is able to produce statistics and predictions related to the activity of a user equipment (UE) or groups of UEs. These statistics and predictions include, but are not limited to, UE mobility patterns (for example, determining if a UE is stationary or mobile, a prediction of the areas that the UE will visit, etc.) and UE communication patterns (time of communications, duration, maximum uplink and downlink bitrates, etc.). Certain Network Functions (NFs) in the 5G core network (5GC), referred to herein as consumer NFs (CNFs), can query the NWDAF or subscribe to receive notifications from the NWDAF to obtain statistics or predictions for a UE or groups of UEs. Exemplary consumer NFs include the Access and Mobility Management Function (AMF), the Session Management Function (SMF) and the Policy Control Function (PCF).

3GPP is currently working in enhancing the analytics architecture for a 5G network, also called a 5G System (5GS). One of these enhancements assumes the existence of distributed NWDAFs that serve a restricted number of UEs rather than the whole set of UEs in the network. For example, distributed NWDAFs could be deployed close to, or as part of, an existing Virtual Network Function (VNF). In particular, Network Functions (NFs) such as Authentication and Mobility Management Function (AMF), Session Management Function (SMF), or User Plane Function (UPF) could feature a distributed NWDAF, which is co-located with the NF and integrated within the VNF. These NFs can function as producers of analytic reports for other consumer NFs. These distributed NWDAFs are not pre-allocated to serve given UEs or group of UEs. When the 5GC allocates an AMF, SMF, or UPF to serve a UE, its co-located and distributed NWDAF is automatically elected to generate and provide analytic reports for such UE.

Other NFs in the 5GC are consumers of analytics and may need to contact a distributed NWDAF co-located with an Access and Mobility Management Function (AMF), Session Management Function (SMF), or User Plane Function (UPF) for retrieving analytic reports. This could be for efficiency reasons, because accessing the co-located instance of a NWDAF will be more efficient than accessing a non-co-located (e.g., centralized) NWDAF. Both the PCF and SMF are examples of these consumers of analytics. Therefore, one challenge is to determine how a consumer NF, such as PCF or SMF, can learn for each UE of interest, whether a distributed NWDAF is producing analytic reports for such UE, and the address of the endpoint (Fully Qualified domain Name (FQDN), port, and Uniform Resource Locator (URL) where analytic reports can be subscribed to or retrieved.

Using existing procedures for NWDAF discovery through a Network Repository Function (NRF), it is not possible for the consumer NFs to discover the distributed and co-located NWDAF instances for a particular UE or group of UEs. Other NWDAF instances (not co-located) may be registered in the NRF for the same analytics, but it would be more efficient to use the NWDAF instances that are co-located with the Producer Network Function (PNF) for network efficiency.

SUMMARY

The present disclosure describes methods and apparatus for exposing and discovering distributed NWDAFs that are co-located with a Producer NF (PNF). Existing procedures and messages between NFs are leveraged to distribute lists of NWDAFs co-located with a NF, such as a UPF, AMF or SMF. The communication procedure can, for example, comprise a procedure to create or modify a session or context for a specified UE. A NF can provide a list of NWDAFs for a particular UE that are co-located with either the same NF or a different NF when the communication procedure for the UE is invoked. Over time, the consumer NFs build a database associating the co-located NWDAFs in other NFs with corresponding UEs served by the consumer NF. When the consumer NF needs analytic data for one or more UEs served by the consumer NF, the consumer NF can use a UE identifier (ID) to look up the co-located NWDAFs for the UE and subscribe with the co-located NWDAFs to receive analytics data for the UE.

A first aspect of the disclosure comprises methods implemented by network node of exposing instances of a NWDAF co-located with a NF in the network node or in a separate producer network node. The network node sends a request message to a consumer network node invoking a communication procedure for a UE served by the network node. The request message includes the UE ID of the UE for which the communication procedure is invoked and a list of NWDAFs co-located with a producer network node providing analytic reports for the UE.

A second aspect of the disclosure comprises methods implemented by a network node of exposing instances of a NWDAF co-located with a NF in a separate producer network node. The network node receives, from a producer network node, a list of NWDAFs co-located with the producer network node in a first request message from the producer network node invoking a communication procedure for a UE or in a response to the second request message sent by the exposing network node to the producer network node invoking a communication procedure for a UE. Thereafter, the exposing network node sends the list of NWDAFs co-located with the producer network node to a consumer network node in a third request message.

A third aspect of the disclosure comprises methods implemented by a network node of exposing instances of a NWDAF co-located with a NF in the network node to a consumer network node via an exposing network node. The network node sends a list of NWDAFs co-located with the network node to an exposing network node in a first request message to the exposing network node invoking a communication procedure for a UE or in a response to a second request message received from the exposing network node invoking a communication procedure for a UE.

A fourth aspect of the disclosure comprises methods implemented by network node including a consumer NF of discovering instances of a NWDAF co-located with a NF in a producer network node. The network node is configured to receive a request message from an exposing network node invoking a communication procedure for a UE served by the exposing network node. The request message includes a list of NWDAFs co-located with the producer network node providing analytic reports for the UE. Upon receiving the request message, the network node stores the information in a memory for subsequent use.

A fifth aspect of the disclosure comprises a network node for exposing instances of a NWDAF with a NF in the network node or in a separate network node. The network node is configured to send a request message to a consumer network node (e.g., PCF) invoking a communication procedure for a UE served by the network node. The request message includes the UE ID of the UE for which the communication procedure is invoked and a list of NWDAFs co-located with a producer network node providing analytic reports for the UE. The network node.

A sixth aspect of the disclosure comprises a network node for exposing a distributed NWDAF co-located with a NF in a separate network node. The network node is configured to receive, from a producer network node, a list of NWDAFs co-located with the producer network node in a first request message from the producer network node invoking a communication procedure for a UE or in a response to the second request message sent by the exposing network node to the producer network node invoking a communication procedure for a UE. The network node is further configured send the list of NWDAFs co-located with the producer network node to a consumer network node in a third request message.

A seventh aspect of the disclosure comprises a network node for exposing instances of a NWDAF co-located with a NF in the network node. The network node is configured to send a list of NWDAFs co-located with the network node to an exposing network node in a first request message to the exposing network node invoking a communication procedure for a UE or in a response to a second request message received from the exposing network node invoking a communication procedure for a UE.

An eighth aspect of the disclosure comprises a network node including a consumer NF that is able to discover instances of a NWDAF 90 co-located with a NF in a separate producer network node. The network node configured to receives a request message from an exposing network node invoking a communication procedure for a UE served by the exposing network node. The request message includes a list of NWDAFs co-located with a producer network node providing analytic reports for the UE. Upon receiving the request message, the network node stores the information in a memory for subsequent use.

A ninth aspect of the disclosure comprises a computer program for a network node. The computer program comprises executable instructions that, when executed by processing circuitry in a network node in a communication network, causes the network node to perform the method according to the first aspect.

A tenth aspect of the disclosure comprises a carrier containing a computer program according to the fifth aspect. The carrier is one of an electronic signal, optical signal, radio signal, or a non-transitory computer readable storage medium.

An eleventh aspect of the disclosure comprises a computer program for a network node. The computer program comprises executable instructions that, when executed by processing circuitry in a network node in a communication network, causes the network node to perform the method according to the second aspect.

A twelfth aspect of the disclosure comprises a carrier containing a computer program according to the seventh aspect. The carrier is one of an electronic signal, optical signal, radio signal, or a non-transitory computer readable storage medium.

A thirteenth aspect of the disclosure comprises a computer program for a network node. The computer program comprises executable instructions that, when executed by processing circuitry in a network node in a communication network, causes the network node to perform the method according to the third aspect.

A fourteenth aspect of the disclosure comprises a carrier containing a computer program according to the seventh aspect. The carrier is one of an electronic signal, optical signal, radio signal, or a non-transitory computer readable storage medium.

A fifteenth aspect of the disclosure comprises a computer program for a network node. The computer program comprises executable instructions that, when executed by processing circuitry in a network node in a communication network, causes the network node to perform the method according to the fourth aspect.

A sixteenth aspect of the disclosure comprises a carrier containing a computer program according to the seventh aspect. The carrier is one of an electronic signal, optical signal, radio signal, or a non-transitory computer readable storage medium.

DETAILED DESCRIPTION

Figure 1:
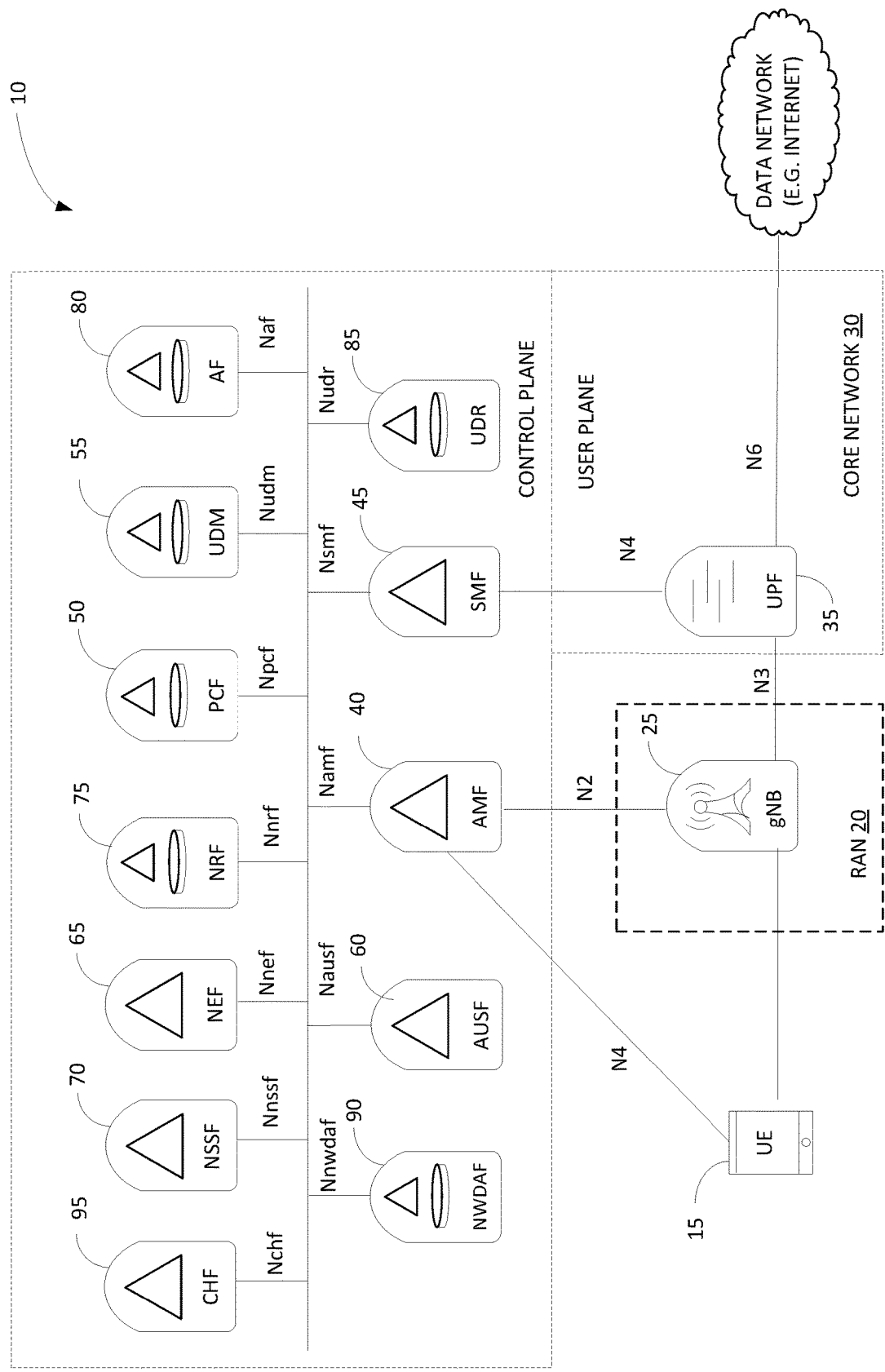
FIG. 1 illustrates logical network functions in a core network of a communication network.

Referring now to the drawings, an exemplary embodiment of the disclosure will be described in the context of a Fifth Generation (5G) communication network. Those skilled in the art will appreciate that the methods and apparatus herein described are not limited to use in 5G networks but may also be used in communication networks operating according to other standards that use a service-based architecture.

FIG. 1 illustrates a communication network 10 according to one exemplary embodiment. The communication network 10 comprises a 5G radio access network (RAN) 20 and a core network 30 employing a service-based architecture. The RAN 20 comprises one or more base stations 25 providing radio access to UEs 15 operating in the communication network 10. The base stations 25 are also referred to in applicable standards as gNodeBs (gNBs). The UEs 15 may comprise cellular phones, smart phones, tablets, laptop computers, or other electronic devices with communication capabilities. The core network 30, referred to herein as a 5G Core (5GC), provides a connection between the RAN 20 and other packet data networks, such as the Internet Protocol (IP) Multimedia Subsystem (IMS) or the Internet. Those skilled in the art will appreciate that other types of RANs in addition to the 5G RAN 20 can connect to the 5GC 30. For example, an Evolved Universal Mobile Telecommunications System (UMTS) Terrestrial Radio Access (EUTRA) base station in an Evolved UMTS Terrestrial Radio Access Network (EU-TRAN) may also connect to the 5GC 30.

The reference architecture for 5G networks, shown in FIG. 1. As seen in FIG. 1, the 5GC 30 comprises a number of Network Function (NFs) including a User Plane Function (UPF) 35, Access and Mobility Management Functions (AMF) 40, Session Management Functions (SMF) 45, a Policy Control Function (PCF) 50, a Unified Data Management (UDM) function 55, a Authentication Server Function (AUSF) 60, a Network Exposure Function (NEF) 65, a Network Slice Selection Function 70, a Network Repository Function (NRF) 75, an Application Functions (AFs) 80 (which may be located in the core network 30 or be external to the core network 30), a Unified Data Repository (UDR) 85, Network Data Analytics Function (NWDAF) 90 and a Charging Function (CHF) 95.

The NFs shown in FIG. 1 comprise logical entities that reside in one or more core network nodes, which may be implemented by one or more processors, hardware, firmware, or a combination thereof. The NFs may reside in a single core network node or may be distributed among two or more core network nodes. Further, the network 10 may include multiple instances of the NFs.

In conventional communication network, the various NFs (e.g., UPF 35, SMF 45, AMF 40, PCF 50, etc.) in the 5GC 30 communicate with one another over predefined interfaces. In the service-based architectures shown in FIG. 1, the 5GC 30 uses a services model in which the NFs query the NRF 75 or other NF discovery node to discover and communicate with each other. The UPF 35, however, is an exception and uses a pre-defined interface called the N4 interface to communicate with the SMF 45. The NFs can subscribe to receive notification services and data from other NFs. In this context, the NF providing the service or data is referred to as a service producer and the NF receiving the data and reports is referred to as a service consumer.

The NWDAF 90 according to 3GGP standards is a service producer because it generates analytic reports used by consumer NFs. The consumer NFs within the 5GC 30 use the Nnwdaf interface to send subscription requests for analytics reports to the NWDAF 90. The request may specify a group of UEs 15 for which data is requested. For example, a consumer NF may request a predicted future trajectory for a group of UEs 15, an activity pattern for the group of services used by the UEs 15, etc. The NWDAF 90 receives subscription requests for analytic data from consumer NFs (e.g., AMF 40, SMF 45, PCF 50) over the Nnwdaf interface, compiles the requested data and generates analytics reports for the UEs 15 identified in the request. The analytic reports can be sent periodically or responsive to a triggering event. In exemplary embodiments of the present disclosure, the functionality of the NWDAF 90 is distributed among multiple NWDAF instances, some of which may be co-located with PNFs, such as a UPF 35, AMF 40 or SMF 45.

3GPP is currently moving away from the use of centralized NWDAFs 90 for large numbers of UEs 15 and towards distributed NWDAFs 90 that serve smaller numbers of the UEs 15. For example, distributed NWDAFs 90 could be deployed close to, or as part of, an existing Virtual Network Function (VNF). In particular, NFs such as the AMF 40, SMF 45 and UPF 35 could feature a distributed NWDAF 90 that is co-located with the NF and integrated within the VNF. These NFs can function as producers of analytic reports for other consumer NFs. These distributed NWDAFs are not pre-allocated to be serving a given UE 15 or group of UEs 15. When the 5GC 30 allocates a UPF 35, AMF 50, SMF 45 to serve a UE 15, its co-located and distributed NWDAF 90 is automatically selected to generate and provide analytic reports for such UE 15.

While a distributed architecture for the NWDAFs 90 serves efficiency, it creates a challenge for the consumer NFs that want to receive analytic reports for a particular UE 15. The challenge is how to identify the distributed NWDAFs 90 that provide analytic data for a particular UE 15. Although other NFs, such as the NRF 75, may expose NWDAFs 90 within the communication network 10, they cannot identify the co-located NWDAF instances for a particular UE 15 or groups of UEs 15.

One aspect of the disclosure comprises methods and apparatus that enable a service consumer (e.g., SMF 45 or PCF 50) to discover and locate distributed NWDAF instances co-located with a NF, referred to herein as distributed NWDAFs 90 or co-located NWDAFs 90, that provide reports for a specified UE 15. Existing procedures and messages between NFs are leveraged to distribute lists of NWDAFs 90 co-located with a NF, such as a UPF 35, AMF 40 or SMF 45. The communication procedure can, for example, comprise a procedure to establish or modify a Packet Data Unit (PDU) session or context for a specified UE 15, a procedure to establish or modify a Packet Forwarding Control Protocol (PFCP) session or context for a specified UE 15, or a procedure to create or modify a SM or AM Policy Association for the UE 15. A NF can provide a list of NWDAFs 90 for the specified UE 15 that are co-located with the same NF or a different producer NF when the communication procedure for the UE 15 is invoked. Over time, the consumer NFs build a database associating the co-located NWDAFs 90 with producer NFs with corresponding UEs 15 served by the consumer NF. When the consumer NF needs analytic data for one or more UEs 15 served by the consumer NF, the consumer NF can use a UE identifier (ID) to look up the co-located NWDAFs for the UE 15 and subscribe with the co-located NWDAFs 90 to receive analytics data for the UE 15.

Figure 2A:
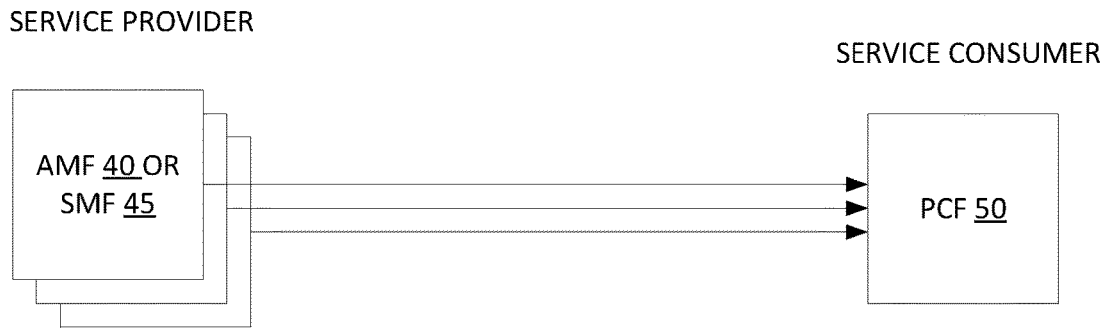
FIGS. 2A-2C illustrate various arrangements between producer NFs and consumer NFs for exposure and discovery of distributed NWDAFs co-located with a producer NF in the core network.
Figure 2B:
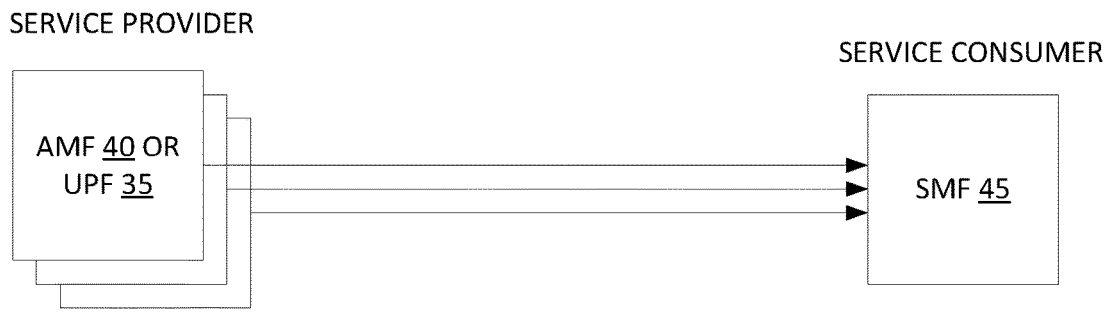
Figure 2C:
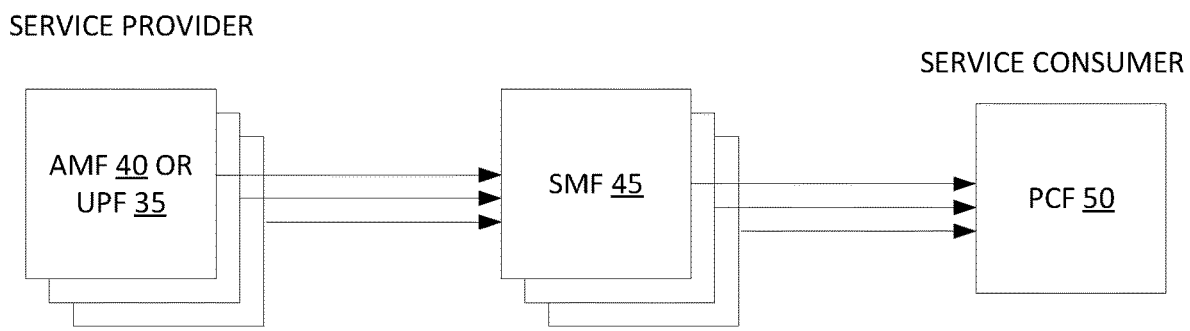

FIGS. 2A-2C illustrate exemplary network implementations for exposing and discovering distributed NWDAFs 90 as herein described.

In FIG. 2A, multiple instances of the AMF 40 or SMF 45 with co-located NWDAFs 90 send lists of the co-located NWDAFs 90 for a UE 15 directly to the PCF 50 when a communication procedure involving the PCF 50 is invoked for the UE 15, such as an AM Policy Association procedure or SM Policy Association procedure. To invoke the communication procedure, an AMF 40 or SMF 45 sends a request message to the PCF 50 identifying the procedure being invoked. The request message further includes the UE ID of the UE 15 for which the procedure is invoked. The UE IDs may comprise an International Mobile Subscriber Identifier (IMSI), or a Subscription Permanent Identifier (SUPI) for example. The PCF 50 can store an association between the UE ID and NWDAFs 90 in a database or table in a memory associated with the PCF 50 for subsequent use.

In FIG. 2B, multiple instances of the UPF 35 or AMF 40 with co-located NWDAFs 90 send lists of the co-located NWDAFs 90 for a UE 15 to the SMF 45 when a communication procedure involving the SMF 45 is invoked for the UE 15. When the NWDAF 90 is co-located with an AMF 40, the AMF 40 sends the list of NWDAFs 90 in a request message identifying a procedure being invoked, such as a PDU session establishment procedure. The request message further includes the UE ID of the UE 15 for which the procedure is invoked. The UE ID may comprise an International Mobile Subscriber Identifier (IMSI), or a Subscription Permanent Identifier (SUPI) for example. When the NWDAF 90 is co-located with the UPF 35, the UPF 35 sends the list of NWDAFs 90 in a response to a request message from the SMF 45, such as a PFCP Session Establishment Request. The SMF 45 can store an association between the UE ID and NWDAFs 90 in a database or table in a memory associated with the AMF 45 for subsequent use.

In FIG. 2C, multiple instances of the UPF 35 or AMF 40 with co-located NWDAFs 90 send lists of co-located NWDAFs 90 for a UE 15 to the PCF 50 indirectly via the SMF 45, which forwards or relays the list from the UPF 35 or AMF 40 to the PCF 50. When the NWDAF 90 is co-located with an AMF 40, the AMF 40 sends the list of NWDAFs 90 to the SMF 45 in a request message (e.g., session establishment request message) when a communication procedure involving the SMF 45 is invoked for the UE 15. The request message includes the UE ID of the UE 15 for which the communication procedure was invoked. The UE ID may comprise an International Mobile Subscriber Identifier (IMSI), or a Subscription Permanent Identifier (SUPI) for example. When the NWDAF 90 is co-located with the UPF 35, the UPF 35 sends the list of NWDAFs 90 in a response to a request message from the SMF 45 when the SMF 45 invokes a communication procedure, such as a PFCP Session Establishment procedure, for the UE 15. In either case, the SMF 45 forwards or relays the list of NWDAFs 90 co-located with the UPFs 35 or AMFs 40 to the PCF 50 when a communication procedure involving the PCF 50 in invoked for the UE 15 as previously described. The PCF 50 can store an association between the UE ID and NWDAFs 90 in a database or table in a memory associated with the PCF 50 for subsequent use.

Figure 3:
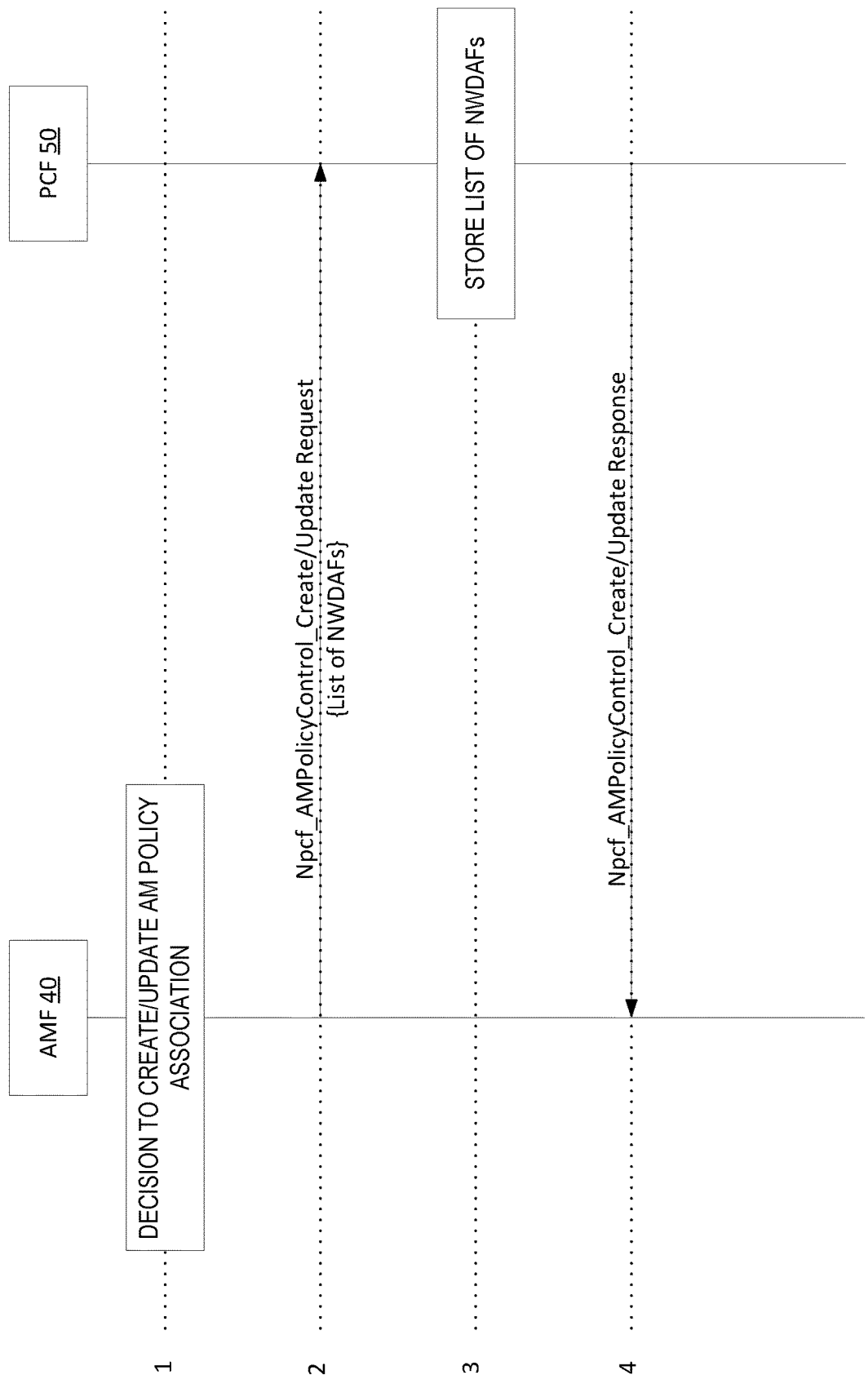
FIG. 3 illustrates an exemplary procedure for distributing a list of NWDAFs co-located with an AMF to a PCF for use by the PCF.

FIG. 3 illustrates an exemplary procedure for indicating a list of NWDAFs 90 co-located with an AMF 40 that serves a particular UE 15 or session to a PCF 50 for use by the PCF 50. When the PCF 50 is the consumer NF, the AM Policy Association procedure is modified to enable the AMF 40 indicate a list of co-located NWDAFs 90 for a particular UE 15. Generally, when the AMF 40 creates or updates an AM Policy Association with the PCF 50 for the UE 15, including due to change of the AMF 40, the AMF 40 indicates to the PCF 50 a list of NWDAFs 90 co-located with the AMF 40 that are available to produce analytics for the UE 15. The list contains, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI.

In the example procedure shown in in FIG. 3, the AMF 40 makes a decision to create or update an AM Policy Association for a particular UE 15 (1) and sends a Npcf_AMPolicyControl_Create request or Npcf_AMPolicyControl_Update request to the PCF 50 (2). The request message includes the UE ID of the UE 15 for which the procedure was invoked and indicates a list of NWDAFs 90 co-located with the AMF 40. The list contains, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI. The PCF 50 stores the information in memory for later use (3). For example, the information may be stored in a database or table in the memory of the PCF 50. The PCF 50 answers the AMF 40 with a Npcf_AMPolicyControl_Create/Update response (4). Thereafter, when the PCF 50 determines that it needs analytics for the UE 15 provided by the co-located NWDAFs 90, the PCF 50 uses the stored information to identify the NWDAFs 90 co-located with the AMF 40 and sends a subscription request to the co-located NWDAFs 90 to request analytics for the UE 15.

Figure 4:
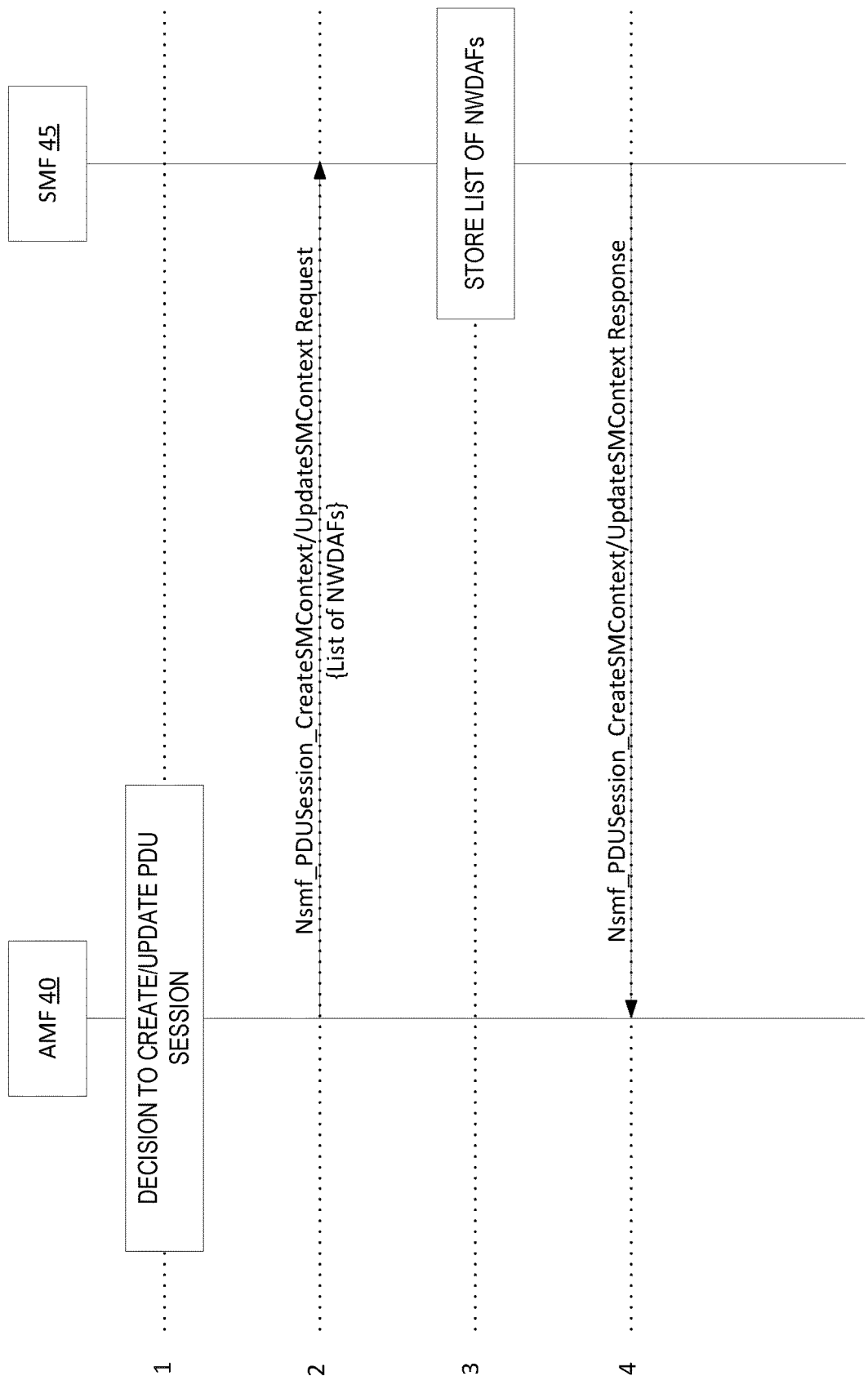
FIG. 4 illustrates an exemplary procedure for distributing a list of NWDAFs co-located with an AMF to a SMF 45 for use by the SMF.

FIG. 4 illustrates an exemplary procedure for indicating a list of NWDAFs 90 co-located with an AMF 40 that serves a particular UE 15 or session to a SMF 45 for use by the SMF 45. When the SMF 45 is the consumer NF, the PDU session establishment or update procedure is modified to enable the AMF 40 to indicate a list of co-located NWDAFs 90 for a particular UE 15. Generally, when the AMF 40 establishes or modifies a PDU session or context with the SMF 45 for the UE 15, the AMF 40 indicates to the SMF 45 a list of NWDAFs 90 co-located with the AMF 40 that are available to produce reports for the UE 15. The list contains, for each NWDAF 90, the analytics IDs that the co-located NWDAF 90 is able to produce, the analytics endpoint that is exposed (e.g., IP address and port number), and the API URI or an API prefix used to build an API URI.

In the example procedure shown in in FIG. 4, the AMF 40 makes a decision to create or update a PDU session for a particular UE 15 (1) and sends a Nsmf_PDUSession_CreateSMContext request or Nsmf_PDUSession_UpdateSMContext request to the PCF 50 (2). The request message includes the UE ID of the UE 15 for which the procedure was invoked and indicates a list of NWDAFs 90 co-located with the AMF 40. The list may also contain, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI. The SMF 45 stores the information in memory for later use (3). For example, the information may be stored in a NWDAF locator database or table in the memory of the SMF 45. The SMF 45 answers the AMF 40 with a Nsmf_PDUSession_CreateSMContext response or Nsmf_PDUSession_UpdateSMContext response) (4). Thereafter, when the SMF 45 determines that it needs analytics for the UE 15 provided by the co-located NWDAFs 90, the SMF 45 uses the stored information to identify the NWDAFs 90 co-located with the AMF 40 and sends a subscription request to the co-located NWDAFs 90 to request analytics for the UE 15.

Figure 5:
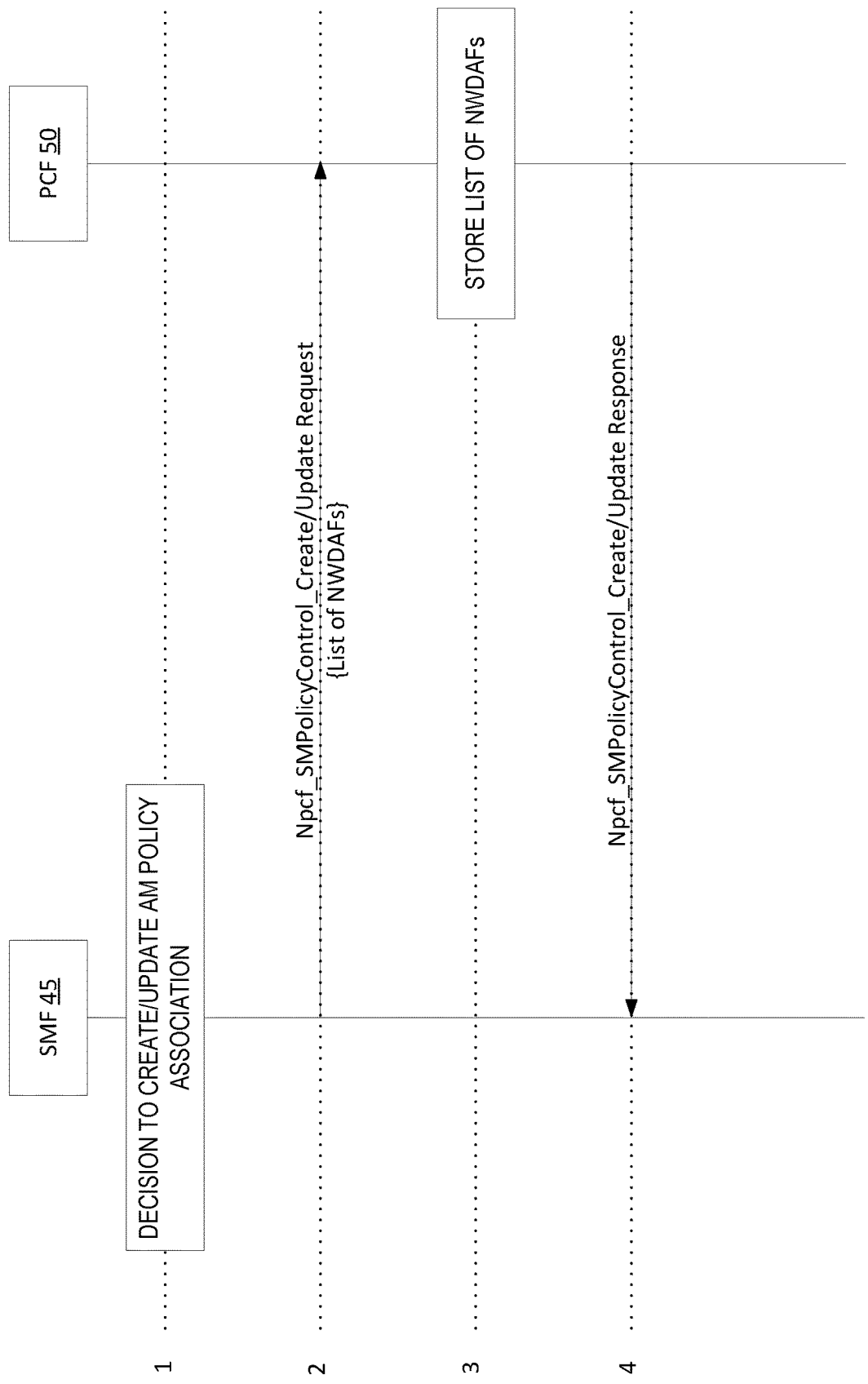
FIG. 5 illustrates an exemplary procedure for distributing a list of NWDAFs co-located with an SMF to a PCF for use by the PCF.

FIG. 5 illustrates an exemplary procedure for indicating a list of NWDAFs 90 co-located with an SMF 45 that serves a particular UE 15 or session to a PCF 50 for use by the PCF 50. When the PCF 50 is the consumer NF, the SM Policy Association procedure is modified to enable the SMF 45 to indicate a list of co-located NWDAFs 90 for a particular UE 15. Generally, when the SMF 45 creates or updates a SM Policy Association with the PCF 50 for the UE 15, the SMF 45 indicates to the PCF 50 a list of NWDAFs 90 co-located with the SMF 45 that are available to produce reports for the UE 15. The list contains, for each NWDAF 90, the analytics IDs that the co-located NWDAF 90 is able to produce, the analytics endpoint that is exposed (e.g., IP address and port number), and the API URI or an API prefix used to build an API URI.

In the example procedure shown in in FIG. 5, the SMF 45 makes a decision to create or update an SM Policy Association for a particular UE 15 (1) and sends a Npcf_SMPolicyControl_Create request or Npcf_SMPolicyControl_Update request to the PCF 50 (2). The request message includes the UE ID of the UE 15 for which the procedure was invoked and a list of NWDAFs 90 co-located with the SMF 45. The list also contains, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI. The PCF 50 stores the information for later use (3). For example, For example, the information may be stored in a NWDAF locator database or table in the memory of the PCF 50. The PCF 50 sends a response message (i.e., Npcf_SMPolicyControl_Create/Update response) to the AMF 40 in response to the request message (4). Thereafter, when the PCF 50 determines that it needs analytics for the UE 15 provided by the co-located NWDAFs 90, the PCF 50 uses the stored information to identify the NWDAFs 90 co-located with the SMF 45 and sends a subscription request to the co-located NWDAFs 90 to request analytics for the UE 15.

Though the procedures shown in FIGS. 3-5 are typically used to convey information about NWDAFs 90 co-located with NF invoking the procedure, those skilled in the art will appreciate that these procedures could also be used to convey information about NWDAFs 90 co-located in other NFs.

Figure 6:
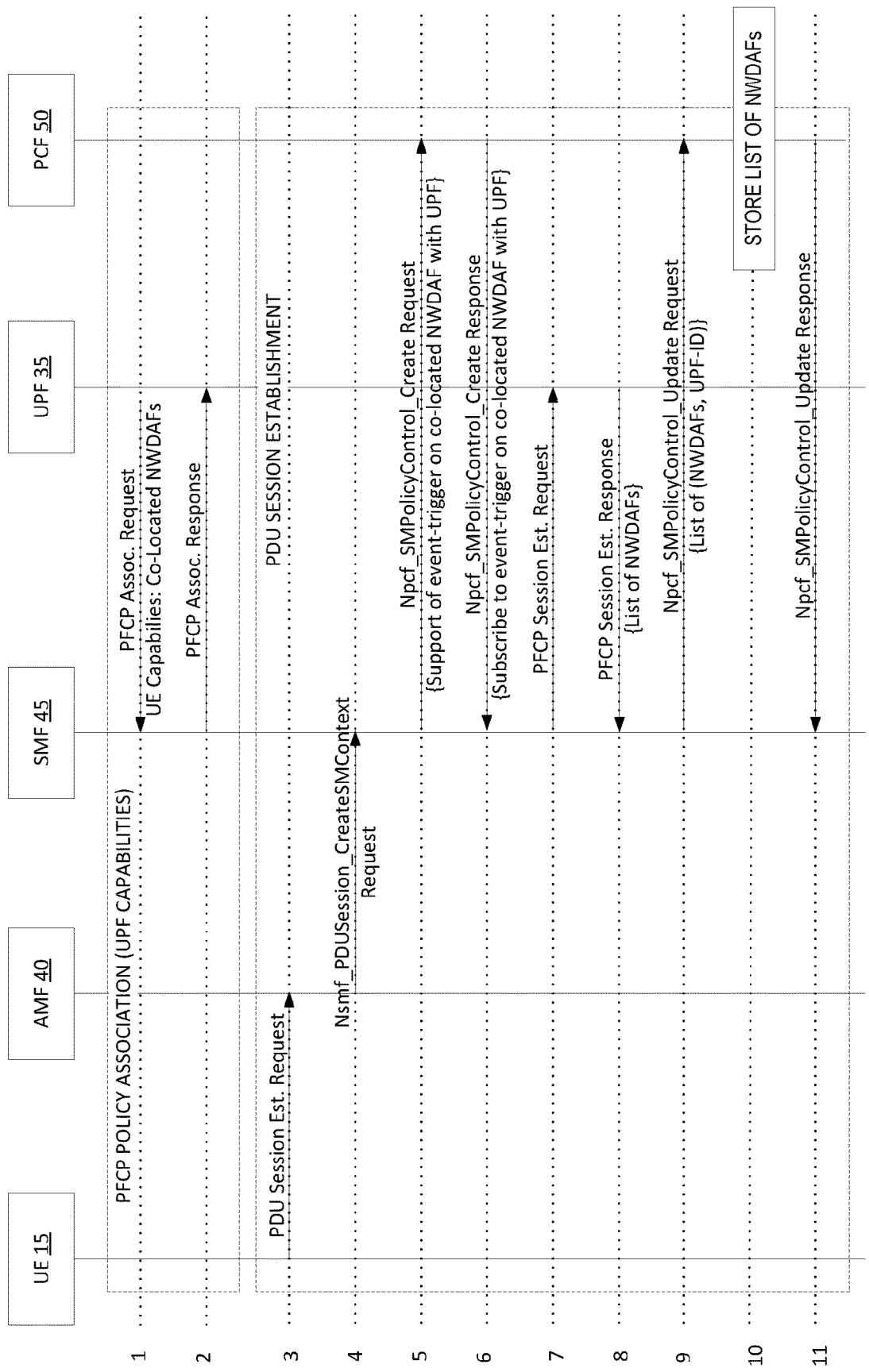
FIG. 6 illustrates an exemplary procedure for distributing a list of NWDAFs co-located with a UPF to a PCF indirectly via a SMF.

FIG. 6 illustrates an exemplary procedure for providing a list of NWDAFs 90 co-located with a UPF 35 that serves a particular UE 15 or session to a PCF 50 indirectly via a SMF 45. The PFCP Policy Association procedure is modified to allow the UPF 35 to report a new capability to the SMF 45 indicating that it supports local analytics, i.e., a NWDAF 90 co-located with the UPF 35. The PDU session establishment procedure is modified to convey the list of NWDAFs 90 co-located with the UPF 35 to the SMF 45. The SM Policy Association procedure is modified to convey a list of NWDAFs 90 co-located with the UPF 35 for a particular UE 15 or session from the SMF 45 to the PCF 50. Generally, when the UPF 35 indicates during a policy control procedure its support for co-located NWDAFs 90 to the SMF 45, the SMF 45 may signal to the PCF 50 that it supports an event trigger on NWDAFs co-located with a UPF 35. The PCF 50 may thereafter subscribe to the event trigger on NWDAFs 90 co-located with a UPF 35 during the policy control procedure. The SMF 45 receives a list of NWDAFs 90 co-located with the UPF 35 when it establishes a PFCP session for the UE 15. If the PCF 50 has subscribed to the event trigger, the SMF 45 sends the list of NWDAFs 90 co-located with the UPF 35 to the PCF 50 when a policy control procedure is invoked to update a SM Policy Association for the UE 15.

In the procedure shown in FIG. 6, the UPF 35 sends a PFCP Association request to the SMF 45 to initiate a PFCP Association procedure (1). The PFCP Association request includes an indication of the UPF 35 support for local analytics, i.e., a NWDAF 90 co-located with the UPF 35. The table below is a list of user plane (UP) Function Features including this new capability, denoted NWDU (the last entry), which can be used to indicate capabilities of the UPF 35 to the SMF 45. Adding this new capability allows the SMF 45 to learn what UPFs 35 support co-located NWDAFs 90 and provide local analytics. In response to the PFCP Association request, the SMF 45 sends a PFCP Association response (2) and the PFCP Association procedure ends.

| Feature Octet/Bit | Feature | Interface | Description |
| --- | --- | --- | --- |
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |

-continued

| Feature Octet/Bit | Feature | Interface | Description |
| --- | --- | --- | --- |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | Sxb, N4 | The UP function supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | NORP | Sxa, Sxb, Sxc, N4 | UP function support of Number of Reports as specified in clause 5.2.2.2. |
| 8/5 | IPTV | N4 | UPF support of IPTV service (see clause 5.25) |
| 8/6 | IP6PL | N4 | UPF supports UE IPv6 address(es) allocation with IPv6 prefix length other than default/64 (including allocating/128 individual IPv6 addresses), as specified in clause 4.6.2.2 of 3GPP TS 23.316 [57], |
| 8/7 | TSCU | N4 | Time Sensitive Communication is supported by the UPF (see clause 5.26). |
| 8/8 | MPTCP | N4 | UPF support of MPTCP Proxy functionality (see clause 5.20) |
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | NWDU | N4 | Network data analytics is supported by the UP function (e.g. through a co-located NWDAF) |

Thereafter, a UE 15 sends a PDU Session Establishment request to an AMF 40 to initiate a PDU Session Establishment procedure and the AMF 40 sends a Nsmf_PDUSession_Create_SMContext request to the SMF 45 to create a new PDU session for the UE 15 (3, 4). The SMF 45 creates a SM Policy Association with the PCF 50 by sending a Npcf_SMPolicyControl_Create request to the PCF 50 (5). The Npcf_SMPolicyControl_Create request is modified to indicate support of a new event trigger enabling the SMF 45 to indicate the presence of UPFs 35 with co-located NWDAFs 90 for this PDU session. The PCF 50 answers the SMF 45 with a Npcf_SMPolicyControl_Create response, including a subscription request to the new event trigger (6). The SMF 45 selects a UPF 50 supporting network data analytics (e.g., through a co-located NWDAF 90) and triggers a PFCP Session Establishment procedure by sending PFCP Session Establishment Request message to the selected UPF 35 (7). The UPF 35 answers the SMF 45 with a PFCP Session Establishment Response message including a list of NWDAFs 90 co-located with the UPF 35 (8). The list may also contain, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI.

Upon receiving the list of co-located NWDAFs 90 from the UPF 35, the SMF 45 triggers an update of the SM Policy Association with the PCF 50 by sending a Npcf_SMPolicyControl_Update request to the PCF 50, including a new event trigger notification containing the list of NWDAFs 90 co-located with the UPF 35 for the UE 15 or session and a UPF identifier (UPF ID) identifying the UPF 35 (9). The list may also contain, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI.

After receiving the list of NWDAFs 90 co-located with the IPF 35, the PCF 50 stores the information for later use and answers the SMF 45 with a Npcf_SMPolicyControl_Update response (10, 11). The PDU Session Establishment continues after the PCF 50 sends the Npcf_SMPolicyControl_Update response, but the remainder of the procedure is omitted for the sake of brevity. Thereafter, when the PCF 50 determines that it needs analytics for the UE 15 provided by the NWDAFs 90 co-located with the UPF 35, the PCF 50 uses the stored information to identify the NWDAFs 90 co-located with the UPF 35 and sends a subscription request to the co-located NWDAFs 90 to request analytics for the UE 15.

Though not shown in the sequence diagram in FIG. 6, in case the SMF 45 triggers UPF relocation after selecting the new UPF 35 and when the new UPF 35 includes a list of NWDAFs 90 as part of the PFCP Session Establishment procedure, the SMF 45 updates the SM Policy Association with the PCF 50 by sending a Npcf_SMPolicyControl_Update request, including a new event trigger notification including the list of NWDAFs 90 co-located with the UPF 35 for the UE 15 or session and a UPF identifier (UPF ID) identifying the UPF 35. The list may also contain, for each NWDAF 90, the analytics IDs that the co-located NWDAF 90 is able to produce, the analytics endpoint that is exposed (e.g., Internet Protocol (IP) address and port number), and the Application Interface (API) Uniform Resource Indicator (URI) or an API prefix used to build an API URI. The PCF 50 stores the information for later use as previously described.

Figure 7:
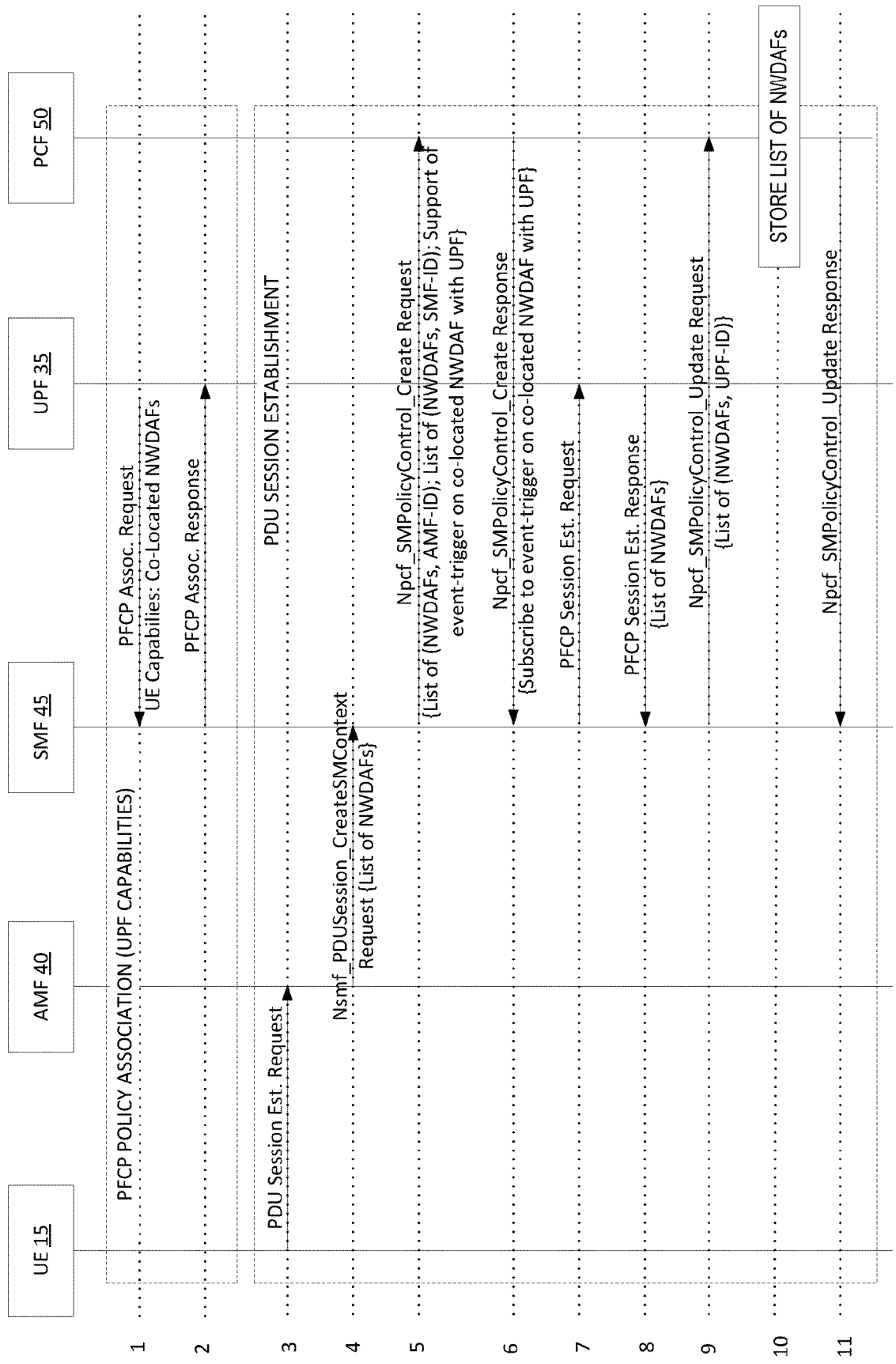
FIG. 7 illustrates an exemplary procedure for distributing lists of NWDAFs co-located with UPF, AMF and SMF to a PCF.

FIG. 7 illustrates variations of the procedure shown in FIG. 6 to convey information about additional NWDAFs 90 co-located with the AMF 40 or SMF 45. For the sake of brevity, only the changed steps are described. Otherwise, the procedure shown FIG. 7 is the same as the procedure in FIG. 6. If the AMF 40 also includes a co-located NWDAF 90 for the UE 15 when the PDU session establishment procedure is triggered by the UE 15, the AMF 40 can include the list of co-located NWDAFs 90 in the Nsmf_PDUSession_Create_SMContext request to the SMF 45 when the AMF 40 creates a new PDU session for the UE 15 with the SMF 45 (4). The SMF 45 can, in turn, include the list of NWDAFs 90 co-located with the AMF 40 along with the AMF Identifier (AMF ID) in the Npcf_SMPolicyControl_Create request to the PCF 50 when the SMF 45 creates a SM Policy Association for the UE 15 with the PCF 50 (5). If the SMF 45 also includes a co-located NWDAF 90 for the UE 15, the SMF 45 can further include the list of co-located NWDAFs 90 with the SMF 45 along with the SMF Identifier (SMF ID) in the Npcf_SMPolicyControl_Create request to the PCF 50 when the SMF 45 creates a SM Policy Association for the UE 15 with the PCF 50 (5). Thus, the Npcf_SMPolicyControl_Create request to the PCF 50 may include, in addition to the list of NWDAFs 90 co-located with the UPF 35, a list of NWDAFs 90 co-located with the AMF 40, a list of NWDAFs 90 co-located with the SMF 45, or both.

In other embodiments, the SMF 45 could include, in addition to the list of NWDAFs 90 co-located with the UPF 35, a list of NWDAFs 90 co-located with the AMF 40, a list of NWDAFs 90 co-located with the SMF 45, or both, in the Npcf_SMPolicyControl_Update request to the PCF 50 when the SMF 45 triggers an update of the SM Policy Association with the PCF 50 (9). A possible drawback to this approach is that the list of NWDAFs 90 co-located with AMF 40 of SMF 45 would not be conveyed to the PCF 50 unless the PCF 50 subscribes to the new event trigger as previously described.

FIGS. 8-11 illustrate exemplary methods implemented by network nodes in the 5GC 30 of the communication network 10 of distributing lists of NWDAFs co-located with a NF, such as an UPF 35, AMF 40 or SMF 45. For convenience, the network nodes are labeled as a producer network node 600, an exposing network node 500 or consumer network node 700 depending on the role of the network node in the distribution of the list. As used herein, a producer network node 600 (shown in FIG. 14) is a network node with a co-located NWDAF 90 that provides analytic reports to a consumer network node 700. For example, the producer network node 600 may comprise a UPF 35, AMF 40 or SMF 45. An exposing network node 500 (shown in FIG. 13) comprises a network node that provides information either directly or indirectly to a consumer network node 700 about distributed NWDAFs 90 co-located with a producer network node 600. A consumer network node 700 (shown in FIG. 15) is the consumer of analytic reports produced by the producer network node 600. Some network nodes may serve as both a producer network node 600 and an exposing network node 500 and are labeled as exposing/producer network nodes 400 (shown in FIG. 12) in the following discussion. While the term exposing/producer network node 400 is used herein for clarity depending on the context, the exposing/producer node 400 is essentially a special case of an exposing network node 500 with a co-located NWDAF 90. Accordingly, the term exposing network node 500 should be construed broadly to include an exposing/producer node 400. Similarly, the exposing/producer node 400 may also be considered as a special case of a producer network node 600 with an exposing function. Accordingly, the term producer network node 600 should be construed broadly to include an exposing/producer node 400.

Figure 8:
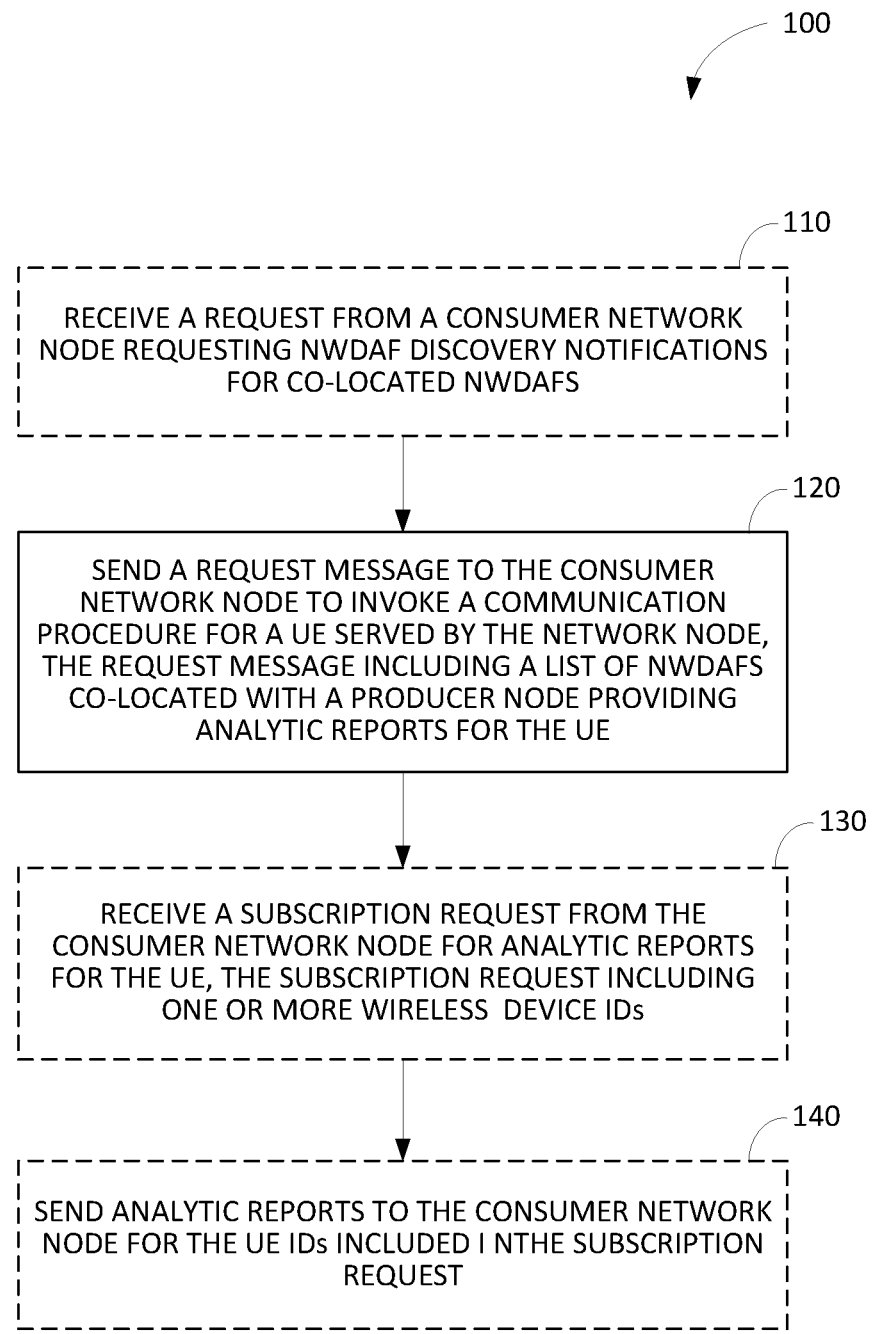
FIG. 8 illustrates an exemplary method implemented by a network node of exposing instances of a NWDAF co-located with a NF in the same network node or a separate producer network node.

FIG. 8 illustrates an exemplary method 100 implemented by an exposing/producer network node 400 of exposing instances of a NWDAF 90 co-located with a NF in the same network node or in a separate network node. The network node 400 may be configured to function as an AMF 40 or SMF 45. The network node 400 optionally receives a request or other indication from a consumer network node 700 requesting NWDAF discovery notifications for co-located NWDAFs 90 (block 110). The request may comprise a subscription request or other service request. In other embodiments, the network node 400 may be preconfigured to report NWDAF updates to the PCF 50 or other consumer network nodes 700, or may be configured to do so by another network node. In any case, when NWDAF reporting is enabled, the network node 400 includes a list of NWDAFs 90 for particular UEs 15 when invoking a communication procedure for the UE 15. To expose the co-located NWDAFs 90, the exposing/producer network node 400 sends a request message to a consumer network node 700 (e.g., PCF 50) invoking a communication procedure for a UE 15 served by the exposing/producer network node 400 (block 120). The request message includes the UE ID of the UE 15 for which the communication procedure is invoked and a list of NWDAFs 90 co-located with a producer network node 600 providing analytic reports for the UE 15. As noted above, the producer network node 600 may comprise a UPF 35, AMF 40 or SMF 45.

In some embodiments, the exposing/producer network node 400 may further receive a subscription request from the consumer network node 700 for analytic reports for the UE (block 130). The subscription request includes a UE identifier (ID) for the UE 15. In practical implementations, the subscription request can request analytic reports for multiple UEs 15 and may provide a list of UE IDs of interest to the consumer network node 700. The UE IDs may comprise an International Mobile Subscriber Identifier (IMSI), or a Subscription Permanent Identifier (SUPI) for example. Once a subscription is activated, the exposing/producer network node 400 sends analytic reports to the consumer network node 700 for the UE IDs included in the subscription request (block 140).

In some embodiments of the method 100, the exposing/producer network node 400 comprises a mobility management node (e.g., AMF 40) or session management node (e.g., SMF 45) and the consumer network node 700 comprises a policy control node (e.g., PCF 50). In one embodiment, the request message comprises a request from the mobility management node (e.g., AMF 40) to the policy control node (e.g., PCF 50) to create or update a policy association for the UE 15. In another embodiment, the request message comprises a request from the session management node (e.g., SMF 45) to the policy control node (e.g., PCF 50) to create or update a policy association for the UE 15.

In some embodiments of the method 100, the exposing/producer network node 400 comprises a mobility management node (e.g., AMF 40) and the consumer network node 700 comprises or session management node (e.g., SMF 45). In on embodiment of the method 100, the request message comprises a request from the mobility management node (e.g., AMF 40) to the session management node (e.g., SMF45) to create or update a session management context for the UE 15.

In some embodiments of the method 100, the exposing/producer network node 400 comprises a session management node 45 and the producer network node 600 comprises one of a mobility management node 40 or user plane node 35.

Some embodiments of the method 100 further comprise, prior to sending the request message, receiving a service request from the consumer network node 700 requesting NWDAF notifications for co-located NWDAFs 90 (block 110). In one example, the exposing/producer network node 400 receives the list of NWDAFs 90 co-located with the mobility management node 40 in the second request message from the mobility management node 40. The second request message may comprise a request from the mobility management node 40 to the session management node 45 to create a session management context node for the UE 15.

In another example, the exposing/producer network node 400 receives the list of NWDAFs 90 co-located with the user plane node 35 in the response to the second request message. The second request message may comprise a request from the session management node 45 to the user plane node 35 to create a policy association for the UE 15.

Some embodiments of the method 100 further comprise receiving, from the user plane node 35, an indication that the user plane node 35 has the co-located NWDAFs 90 before sending the second request message.

In some embodiments of the method 100, the exposing/producer network node 400 is the producer network node 600 and the list of NWDAFs 90 comprises a list of NWDAFs 90 co-located with the exposing/producer network node 400.

Some embodiments of the method 100 further comprise receiving an analytics subscription request from the consumer network node 700 requesting to receiving analytic reports for the UE 15, and sending, responsive to the analytics subscription request, an analytics report for the UE to the consumer network node 700 (blocks 130-140).

Figure 9:
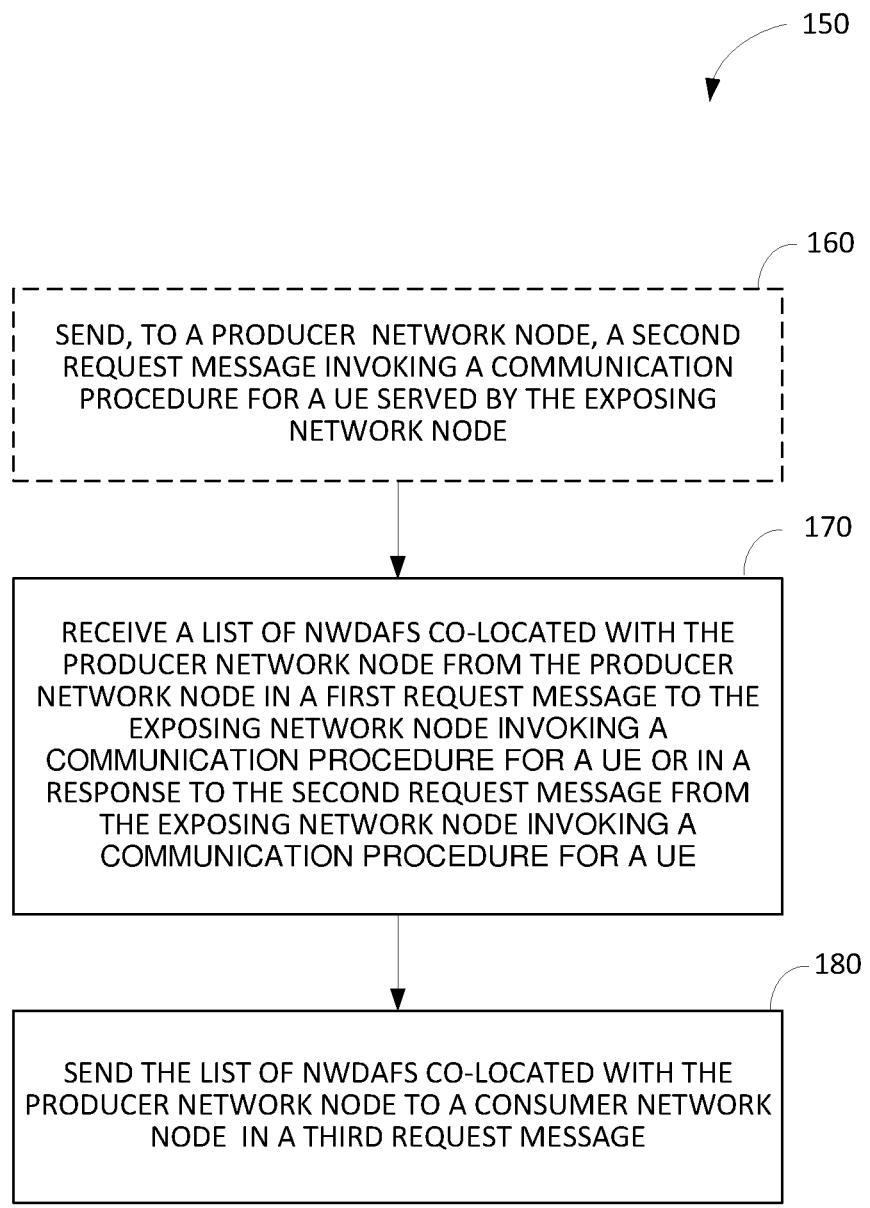
FIG. 9 illustrates an exemplary method implemented by a network node of exposing instances of a NWDAF co-located with a NF in a separate producer network node.

FIG. 9 illustrates an exemplary method 150 implemented by an exposing network node 500 in a 5GC 30 of a communication network 10 of exposing instances of a NWDAF 90 co-located with a NF in a separate producer network node 600. The exposing network node 500 may comprise, for example a SMF 45 and the producer network node 600 may comprise a UPF 35 or AMF 40. It is assumed that a consumer network node 700 has requested NWDAF discovery notification from the exposing network node 500, or that the exposing network node 700 is configured to provide NWDAF notifications. The exposing network node 500 optionally sends, to a producer network node 600, a second request message invoking a communication procedure for a UE 15 served by the exposing network node 500 (block 160). The exposing network node 500 receives, from a producer network node 600, a list of NWDAFs 90 co-located with the producer network node 600 in a first request message from the producer network node 600 invoking a communication procedure for a UE 15 or in a response to the second request message sent by the exposing network node 500 to the producer network node 600 invoking a communication procedure for a UE 15 (block 170). Thereafter, the exposing network node 500 sends the list of NWDAFs 90 co-located with the producer network node 600 to a consumer network node 700 in a third request message (block 180).

In some embodiments of the method 150, the exposing network node 500 comprises a session management node (e.g., SMF 45) and the producer network node 600 comprises a user plane node (e.g., UPF 35) or mobility management node (e.g., AMF 40).

In some embodiments of the method 150, the producer network node 600 comprises a mobility management node (e.g., AMF 40) and the first request message is a session management request message from the mobility management node 40 to the session management node (e.g., SMF 45). The exposing network node 500 receives the list of NWDAFs 90 co-located with the mobility management node (e.g., AMF 40) in the session management request message. The session management request message may comprise a request to create a session management context for the UE 15.

In some embodiments of the method 150, the producer network node 600 comprises a user plane node (e.g., UPF 35) and the second service request message may comprise a packet forwarding control request message from the session management node (e.g., SMF 45) to the user plane node (e.g., UPF 35). The session management node (e.g., SMF 45) receives the list of NWDAFs 90 co-located with the user plane node (e.g., UPF 35) in the response to the packet forwarding control request message sent by the session management node (e.g., SMF 45). In this case, the packet forwarding control request message may comprise a request to create a packet forwarding session for the UE 15.

Some embodiments of the method 150 further comprise receiving, from the user plane node 35, an indication that the user plane node 35 has the co-located NWDAFs 90 before sending the second request message (block 160).

In some embodiments of the method 150, the list of NWDAFs 90 co-located with the producer network node 600 is sent to the consumer network node 700 in a second policy control request message. In this case, the policy control request message may comprise a request to update the policy association for the UE 15.

Figure 10:
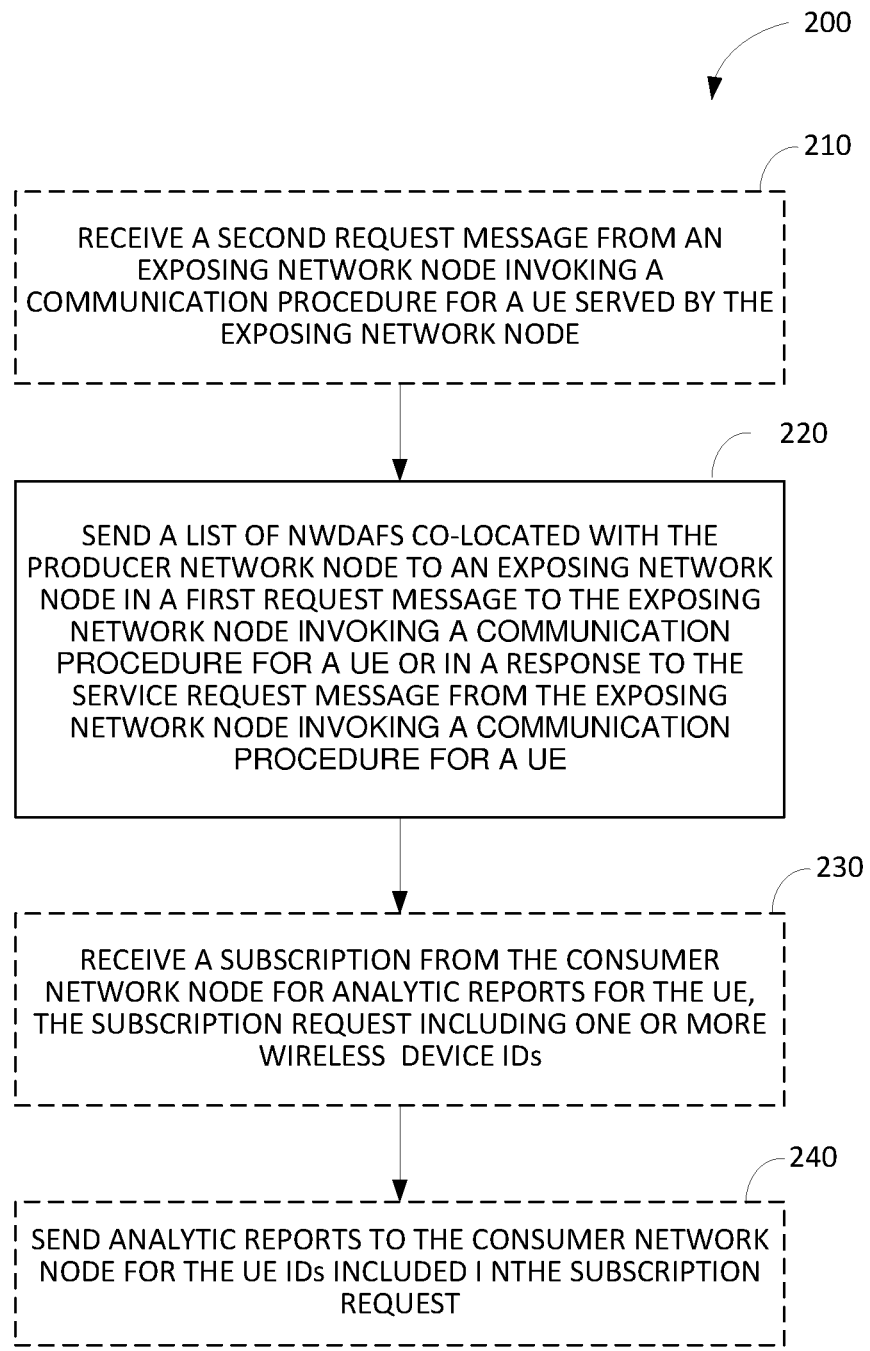
FIG. 10 illustrates an exemplary method implemented by a network node of exposing instances of NWDAFs co-located with a NF in the same network node.

FIG. 10 illustrates an exemplary method 200 implemented by a producer network node 600 of exposing instances of a NWDAF 90 co-located with a NF in the producer network node 600 to a consumer network node 700 via an exposing network node 500. The producer network node 600 in this case may comprise, for example, a UPF 35 or AMF 40, the exposing network node 500 may comprise an SMF 45, and the consumer network node 700 may comprise a PCF 50. In this method 200, the producer network node 600 optionally receives a second request message from an exposing network node 500 invoking a communication procedure for a UE 15 serviced by the exposing network node 500 (block 210). The producer network node 600 sends a list of NWDAFs 90 co-located with the producer network node 600 to an exposing network node 500 in a first request message to the exposing network node 500 invoking a communication procedure for a UE 15 or in a response to a second request message received from the exposing network node 500 invoking a communication procedure for a UE 15 (block 220).

In some embodiments, a producer network node 600 may further receive a subscription request from the consumer network node 700 for analytic reports for the UE (block 230). The subscription request includes a UE identifier (ID) for the UE 15. In practical implementations, the subscription request can request analytic reports for multiple UEs 15 and may provide a list of UE IDs of interest to the consumer network node 700. The UE IDs may comprise an International Mobile Subscriber Identifier (IMSI), or a Subscription Permanent Identifier (SUPI) for example. Once a subscription is activated, the exposing/producer network node 400 sends analytic reports to the consumer network node 700 for the UE IDs included in the subscription request (block 240).

In some embodiments of the method 200, the producer network node 600 comprises one of a user plane node (e.g., UPF 35) and mobility management node (e.g., AMF 40) and the exposing network node 500 comprises a session management node (e.g., SMF 45).

In some embodiments of the method 200, the producer network node 600 comprises a mobility management node (e.g., AMF 40) and the first request message comprises a session management request message from the mobility management node (e.g., AMF 40) to the session management node (e.g., SMF 45). The mobility management node (e.g., AMF 40) sends list of NWDAFs 90 co-located with the mobility management node (e.g., AMF 40) to the session management node 45 in the session management request message. The session management request message may comprise a request to create a session management context for the UE 15.

In some embodiments of the method 200, the producer network node 600 comprises a user plane node (e.g., UPF 35) and the second service request message comprises a packet forwarding control request message from the session management node (e.g., SMF 45) to the user plane node (e.g., UPF 35). The user plane node (e.g., UPF 35) sends the list of NWDAFs 90 co-located with the user plane node (e.g., UPF 35) to the session management node (e.g., SMF 45) in a response to the packet forwarding control request message. The packet forwarding control request message may comprise a request to create a packet forwarding session for the UE 15.

Some embodiments of the method 200 further comprise sending, to the session management node (45), an indication that the user plane node (35) has the co-located NWDAFs (90) before receiving the second request message (block 210).

Some embodiments of the method 200 further comprise receiving an analytics subscription request from a consumer network node 700 requesting to receive analytic reports for the UE 15 (block 230) and sending, responsive to the analytics subscription request, an analytics report for the UE 15 to the consumer network node 700. (block 240)

Figure 11:
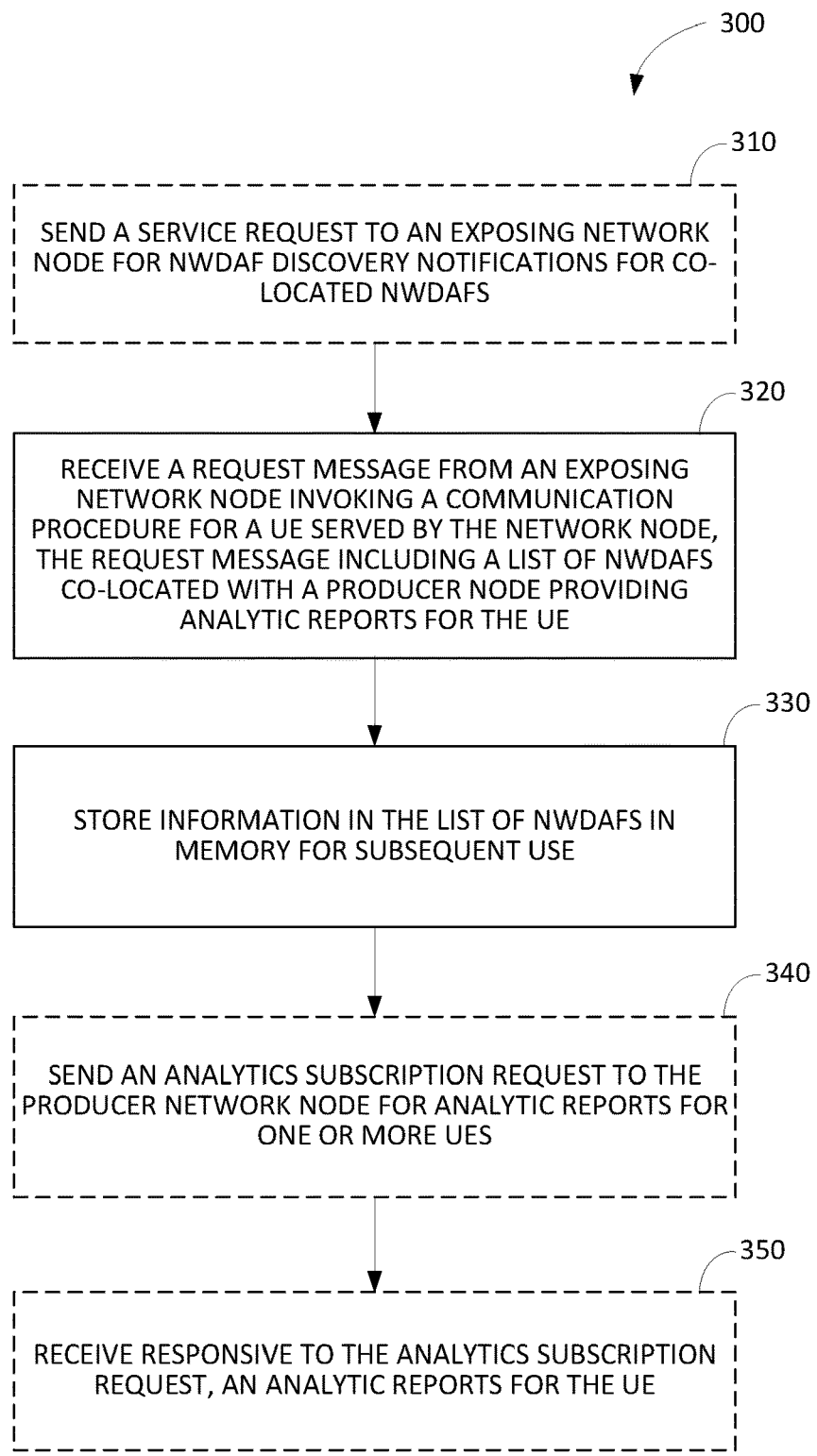
FIG. 11 illustrates an exemplary method implemented by a network node of discovering instances of NWDAFs co-located with a NF in a producer network node.

FIG. 11 illustrates an exemplary method 300 by a consumer network node 700 including a consumer NF of discovering instances of a NWDAF 90 co-located with NFs in a producer network node. The consumer network node 700 may comprise a SMF 45 or PCF 50. In this method 300, the consumer network node 700 optionally sends a service request to an exposing network node 500 requesting notifications for distributed NWDAFs co-located with a producer NF in a producer network node 600. The exposing network node 500 may comprise, for example, an AMF 40 or SMF 45. The consumer network node 700 optionally sends a service request to an exposing network node 500 requesting notification for co-located NWDAFs 90 (block 310). The consumer network node 700 receives a request message from an exposing network node 500 invoking a communication procedure for a UE 15 served by the exposing network node 500 (block 320). The request message includes a list of NWDAFs 90 co-located with a producer network node 600 providing analytic reports for the UE 15. Upon receiving the request message, the consumer network node 700 stores information in the list of NWDAFs in memory (block 330).

In some embodiments of the method 300, the exposing network node 500 comprises a mobility management node (e.g., AMF 40) or session management node (e.g., SMF 45) and the consumer network node comprises a policy control node 50 (e.g., PCF 50). When the exposing network node 500 comprises the mobility management node 40 (e.g., AMF 40), the request message may comprise a request from the mobility management node 40 (e.g., AMF 40) to the policy control node (e.g., PCF 50) to create or update a policy association for the UE 15. When the exposing network node 500 comprises the session management node (e.g., SMF 45), the request message comprises a request from the session management node 45 (e.g., SMF 45) to the policy control node 50 to create or update a policy association for the UE 15.

In some embodiments of the method 300, the exposing network node 500 comprises a mobility management node 40 (e.g., AMF 40) and the consumer network node 700 comprises a session management node (e.g., SMF 45). In this case, the request message may comprise a request from the mobility management node (e.g., AMF 40) to the session management node (e.g., SMF 45) to crate or update a session management context for the UE 15.

In some embodiments of the method 300, the exposing network node 500 is the producer network node 600 and the list of NWDAFs 90 comprises a list of NWDAFs 90 co-located with the exposing network node 500.

In some embodiments of the method 300, the producer network node 600 comprises a user plane node 35, the exposing network node 500 comprises a session management node 45 and the list of NWDAFs 90 comprises a list of NWDAFs 90 co-located with the user plane node 35.

Some embodiments of the method 300 further comprise, prior to receiving the request message, sending a service request to the exposing network node 500 requesting NWDAF discovery notifications for producer network nodes 300 having co-located NWDAFs 90 (block 310).

Some embodiments of the method 300 further comprise sending an analytics subscription request to the producer network node 600 requesting analytic reports for the UE 15 (block 340) and receiving, responsive to the analytics subscription request, an analytics report for the UE 15 (block 350).

Those skilled in the art will recognize that there are different ways to include a list of co-located NWDAFs 90 in a request message in the methods shown in FIGS. 8-11. The list itself of NWDAFs 90 may be embedded in the request message. Alternatively, a list of NWDAFs 90 can be included in a request message by putting a reference to the list or other indication of the list in the request message and the receiving network node can use the reference to identify a list stored in memory, or to retrieve a list form another network node. The term "include" when used in the claims is intended to be read broadly to encompass each of these methods of indicating a list.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
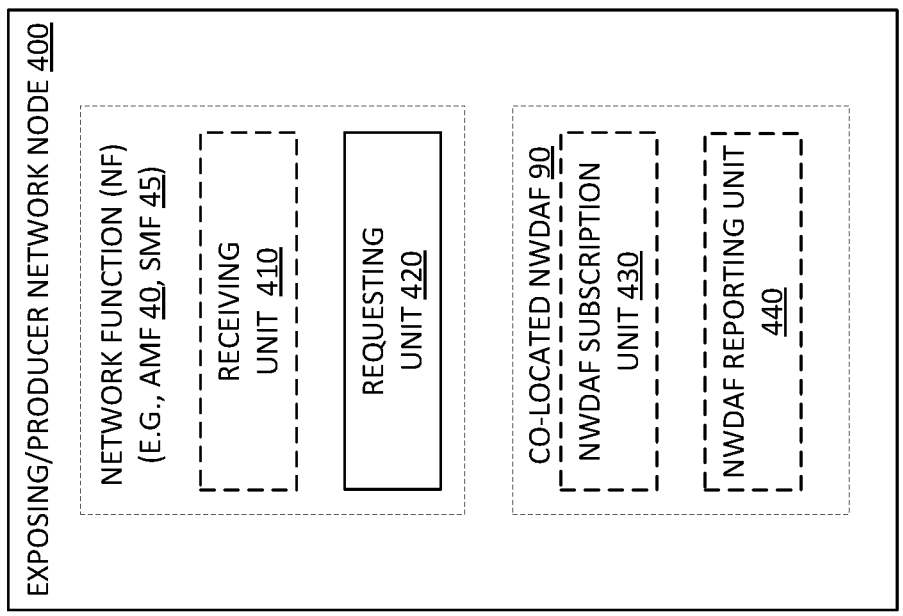
FIG. 12 illustrates an exemplary network node configured to expose instances of a NWDAF in the same network node or in a separate producer network node.

FIG. 12 illustrates an exemplary exposing/producer network node 400 configured to perform the method 100 shown in FIG. 8. The exposing/producer network node 400 comprises an optional receiving unit 410, a requesting unit 420, an optional NWDAF subscription unit 430, and an optional NWDAF reporting unit 440. The receiving unit 410 and requesting unit 420 are part of a producer NF, such as an AMF 40 or SMF 45. The NWDAF subscription unit 430, and a NWDAF reporting unit 440 are part of a NWDAF 90 co-located with a NF at the exposing/producer network node 400. The various units 410-440 can be implemented by hardware and/or by software code that is executed by a processor or processing circuit. The receiving unit 410, when present, is configured to receive a service request or other indication from a consumer network node 700 requesting notifications for co-located NWDAFs 90. The requesting unit 420 is configured to send a request message to a consumer network node 700 (e.g., PCF 50) invoking a communication procedure for a UE 15 served by the exposing/producer network node 400. The NWDAF subscription unit 430, when present, is configured to receive a subscription request from the consumer network node 700 for analytic reports for the UE 15. The NWDAF reporting unit 440, when present, is configured to send analytic reports to the consumer network node 700 for the UE IDs included in the subscription request.

Figure 13:
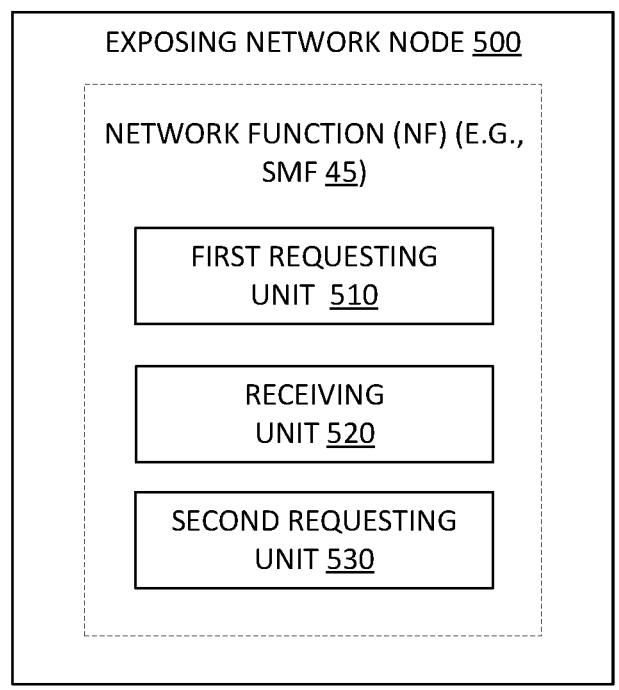
FIG. 13 illustrates an exemplary network node configured to expose instances of a NWDAF co-located with a NF in a separate producer network node.

FIG. 13 illustrates another exemplary exposing network node 500 configured to perform the method shown in FIG. 9. The exposing network node 500 comprises a first requesting unit 510, a receiving unit 520, and a second requesting unit 530. The first requesting unit 510, a receiving unit 520, a second requesting unit 530 are part of a NF, such as an AMF 40 or SMF 45. The various units 510-530 can be implemented by hardware and/or by software code that is executed by a processor or processing circuit. The first requesting unit 510 is configured to send, to a producer network node 600, a second request message invoking a communication procedure for a UE 15 served by the exposing network node 500. The receiving unit 520 is configured to receive, from a producer network node 600, a list of NWDAFs 90 co-located with the producer network node 600 in a first request message from the producer network node 600 invoking a communication procedure for a UE 15 or in a response to the second request message sent by the exposing network node 500 to the producer network node 600 invoking a communication procedure for a UE 15. The second requesting unit 530 is configured to send the list of NWDAFs (90) co-located with the producer network node 600 to a consumer network node 700 in a third request message.

Figure 14:
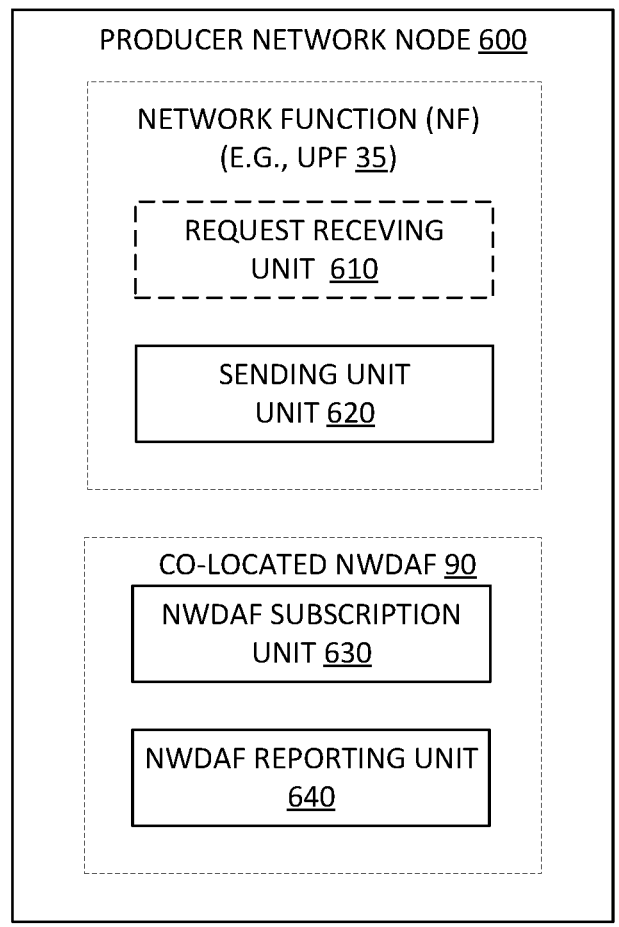
FIG. 14 illustrates another exemplary method implemented by a network node configured to expose instances of a NWDAF co-located with a NF in the network node.

FIG. 14 illustrates a producer network node 600 including a NWDAF co-located with a producer NF in the producer network node 600 and configured to perform the method 200 of FIG. 10. The producer network node 600 comprises an optional request receiving unit 610, a sending unit 620, an optional NWDAF subscription unit 630, and an optional NWDAF reporting unit 640. The request receiving unit 610 and sending unit 620 are part of a producer NF, such as a UPF 35. The NWDAF subscription unit 630, and NWDAF reporting unit 640 are part of a NWDAF 90 co-located with the producer NF at the producer network node 600. The various units 610-640 can be implemented by hardware and/or by software code that is executed by a processor or processing circuit. The request receiving unit 610, when present, is configured to receive a second request message from an exposing network node 500 invoking a communication procedure for a UE 15 serviced by the exposing network node 500. The sending unit 620 is configured to send a list of NWDAFs 90 co-located with the producer network node 600 to an exposing network node 500 in a first request message to the exposing network node 500 invoking a communication procedure for a UE 15 or in a response to a second request message received from the exposing network node 500 invoking a communication procedure for a UE 15. The NWDAF subscription unit 630, when present, is configured to receive a subscription request from the consumer network node 700 for analytic reports for the UE 15. The NWDAF reporting unit 640, when present, is configured to send analytic reports to the consumer network node 700 for the UE IDs included in the subscription request.

Figure 15:
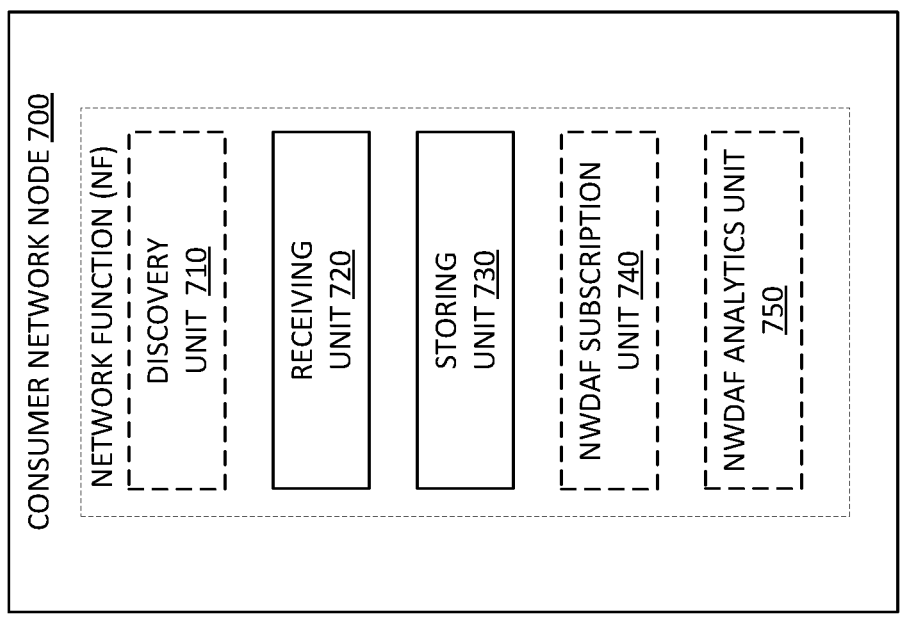
FIG. 15 illustrates an exemplary method implemented by a network node of discovering instances of a NWDAF co-located with a NF in a producer network node.

FIG. 15 illustrates an exemplary consumer network node 700 configured to perform the method 300 of FIG. 11. The consumer network node 700 comprises a discovery unit 710, a receiving unit 720, a storing unit 730, an optional NWDAF subscription unit 740, and an optional NWDAF analytics unit 750. The various units 710-750 can be implemented by hardware and/or by software code that is executed by a processor or processing circuit. The discovery unit 710, when present, is configured to send a service request to an exposing network node 500 requesting notifications for distributed NWDAFs co-located with a PNF. The receiving unit 720 is configured to receive a request message from an exposing network node 500 invoking a communication procedure for a UE 15 served by the exposing network node 500. The storing unit 730 is configured to store information from the lists of NWDAFs 90 in memory for later use in obtaining analytic reports as herein described. The request message includes a list of NWDAFs 90 co-located with a producer network node 600 providing analytic reports for the UE 15. The NWDAF subscription unit 740, when present, is configured to send an analytics subscription request to the producer network node 600 requesting analytic reports for the UE 15. The NWDAF analytics unit 750, when present, is configured to receive, responsive to the analytics subscription request, an analytics report for the UE 15

Figure 16:
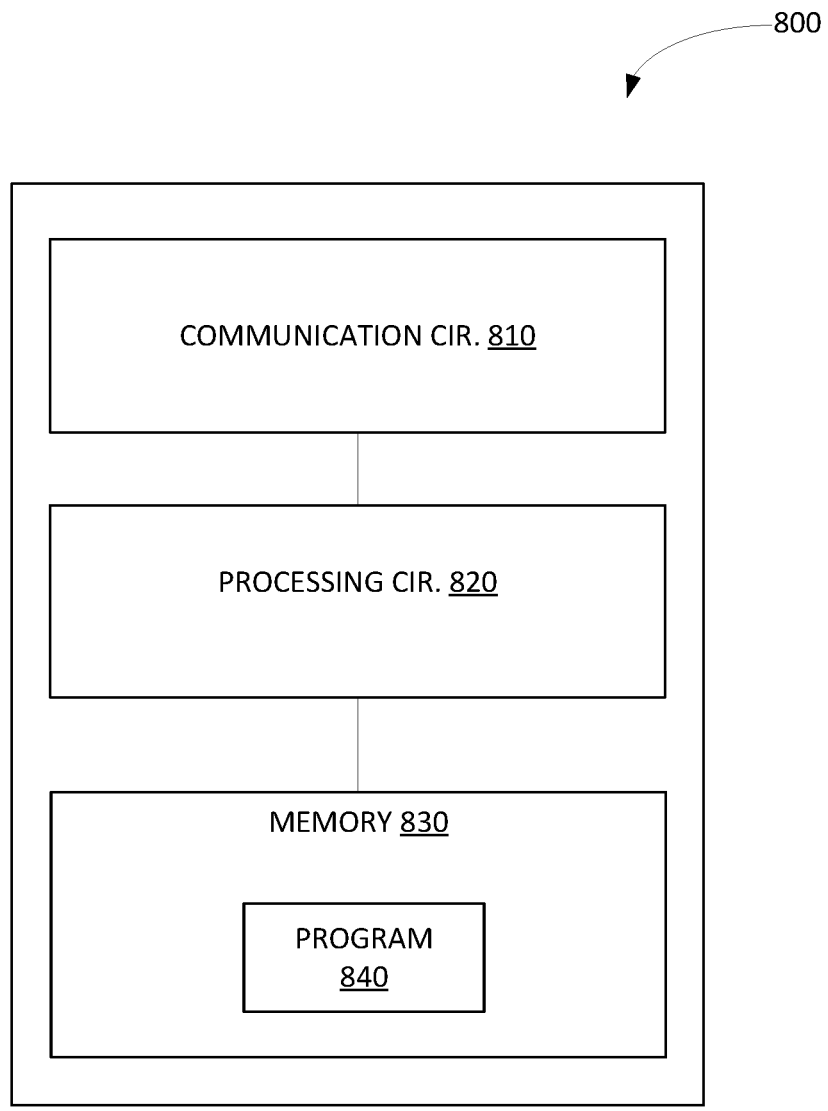
FIG. 16 illustrates an exemplary network node that can be configured as a producer network node, a consumer network node, an exposing network node or any combination thereof.

FIG. 16 illustrates the main functional components of a network node that can be configured as an exposing network node 500, a producer network node 600, a consumer network node 700, or some combination thereof. The network node 800 comprises communication circuitry 810, processing circuitry 820, and memory 830.

The communication circuitry 810 comprises network interface circuitry for communicating with other core network nodes in the communication network over a communication network, such as an Internet Protocol (IP) network.

Processing circuitry 820 controls the overall operation of the network node 800 and is configured to perform one or more of the methods 100, 150, 200 and 300 shown in FIGS. 8-11 respectively. The processing circuitry 820 may comprise one or more microprocessors, hardware, firmware, or a combination thereof.

Memory 830 comprises both volatile and non-volatile memory for storing computer program code and data needed by the processing circuitry 820 for operation. Memory 830 may comprise any tangible, non-transitory computer-readable storage medium for storing data including electronic, magnetic, optical, electromagnetic, or semiconductor data storage. Memory 830 stores a computer program 840 comprising executable instructions that configure the processing circuitry 820 to implement one or more of the methods 100, 150, 200 and 300 shown in FIGS. 8-11 respectively y. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 840 for configuring the processing circuitry 820 as herein described may be stored in a removable memory, such as a portable compact disc, portable digital video disc, or other removable media. The computer program 840 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The exposure and discovery techniques as herein described leverage existing procedures and messages to enable consumer NFs in the 5GC 30 discover NWDAFS 90 co-located with producer NFs so that the consumer NF can request local analytics for a UE or group of UEs. The techniques improve efficiency from the perspective of the consumer NF because it is more efficient for the consumer NF to obtain analytics from a NWDAF co-located with the producer NF than from a centralized NWDAF.

What is claimed is:

1. A method implemented by a network node of exposing instances of a network data analytics function co-located with a Network Function in a core network of a communication network, the method comprising:
    sending a request message to a consumer network node invoking a communication procedure for a UE served by the network node, the request message including a list of NWDAFs co-located with a producer network node providing analytic reports for the UE.

2. The method of claim 1, wherein the network node comprises a mobility management node and the request message comprises a request from the mobility management node to a policy control node to create or update a policy association for the UE.

3. The method of claim 1, wherein the network node comprises a mobility management node and the request message comprises a request from the session management node to a policy control node to create or update a policy association for the UE.

4. The method of claim 1, wherein the network node comprises mobility management node and the request message comprises a request from the mobility management node to a session management node to create or update a session management context for the UE.

5. The method of claim 1, further comprising:
  receiving an analytics subscription request from the consumer network node requesting to receive analytic reports for the UE; and
  sending, responsive to the analytics subscription request, an analytics report for the UE to the consumer network node.

6. A network node in a core network of a communication network configured to expose instances of a network data analytics function co-located with a Network Function in a core network of a communication network, the network node comprising:
  communication circuitry for communicating with an exposing network node in the communication network; and
  processing circuitry configured to:
  receive a list of NWDAFs co-located with the producer network node in a first request message from the producer network node invoking a communication procedure for a UE or in a response to a second request message received from the producer network node invoking a communication procedure for a UE; and
  send the NWDAFs co-located with the producer network node to a consumer network node in a third request message.

7. A method implemented by a network node of exposing instances of a network data analytics function co-located with a Network Function in a core network of a communication network, the method comprising:
  Sending, from a producer network node, a request message to a consumer network node invoking a communication procedure for a UE served by the network node, the request message including a list of NWDAFs co-located with the producer network node providing analytic reports for the UE.

8. The method of claim 7, wherein:
  the producer network node is a mobility management node;
  the consumer network node is a policy control node; and
  the request message is a request from the mobility management node to a policy control node to create or update a policy association for the UE.

9. The method of claim 7, wherein:
  the producer network node is a mobility management node;
  the consumer network node is a session management node; and
  the request message comprises a request from the session management node to a policy control node to create or update a policy association for the UE.

10. The method of claim 7, wherein:
  the producer network node is a mobility management node;
  the consumer network node is a session management node; and
  the request message comprises a request from the mobility management node to a session management node to create or update a session management context for the UE.

* * * * *